United States Patent
Nakao et al.

(10) Patent No.: US 8,674,949 B2
(45) Date of Patent: Mar. 18, 2014

(54) LIQUID CRYSTAL DISPLAY APPARATUS

(75) Inventors: Kenji Nakao, Kanazawa (JP); Yasuyuki Tsuji, Kanazawa (JP); Mitsutaka Okita, Hakusan (JP); Shigesumi Araki, Kanazawa (JP)

(73) Assignee: Japan Displays Inc., Tokyo (JP)

( * ) Notice: Subject to any disclaimer, the term of this patent is extended or adjusted under 35 U.S.C. 154(b) by 1418 days.

(21) Appl. No.: 12/032,236

(22) Filed: Feb. 15, 2008

(65) Prior Publication Data

US 2008/0211787 A1 Sep. 4, 2008

(30) Foreign Application Priority Data

Feb. 20, 2007 (JP) ................................. 2007-039965
Feb. 26, 2007 (JP) ................................. 2007-046081

(51) Int. Cl.
*G06F 3/041* (2006.01)
(52) U.S. Cl.
USPC .......................................................... 345/173
(58) Field of Classification Search
USPC ..................... 345/156–157, 173, 175, 102; 178/18.09, 18.11
See application file for complete search history.

(56) References Cited

U.S. PATENT DOCUMENTS

2003/0234759 A1* 12/2003 Bergquist ........................ 345/92
2004/0095402 A1* 5/2004 Nakano ........................ 346/102
2006/0007096 A1* 1/2006 Kawaguchi et al. ........... 345/102
2006/0170658 A1* 8/2006 Nakamura et al. ............. 345/173
2007/0103425 A1* 5/2007 Tanaka et al. .................. 345/102
2008/0055266 A1* 3/2008 Harada et al. .................. 345/173

FOREIGN PATENT DOCUMENTS

JP 2001-292276 10/2001
JP 2004-318819 11/2004

OTHER PUBLICATIONS

U.S. Appl. No. 12/123,053, filed May 19, 2008, Nakao, et al.

* cited by examiner

*Primary Examiner* — Jonathan Horner
(74) *Attorney, Agent, or Firm* — Oblon, Spivak, McClelland, Maier & Neustadt, L.L.P.

(57) ABSTRACT

A liquid crystal display apparatus includes a display panel configured to have a plurality of scanning lines for which liquid crystal display elements each containing an optical input device and a display pixel are arranged, respectively, a backlight configured to be arranged facing the display panel to illuminate the display panel, and a control part configured to control writing into the display pixel and reading of a detection signal of the optical input device, wherein the control part displays an external light detection image substantially shielding light from the backlight on the display pixels throughout a first period of a frame period, and displays a display image on the display pixels throughout a second period of the frame period.

9 Claims, 19 Drawing Sheets

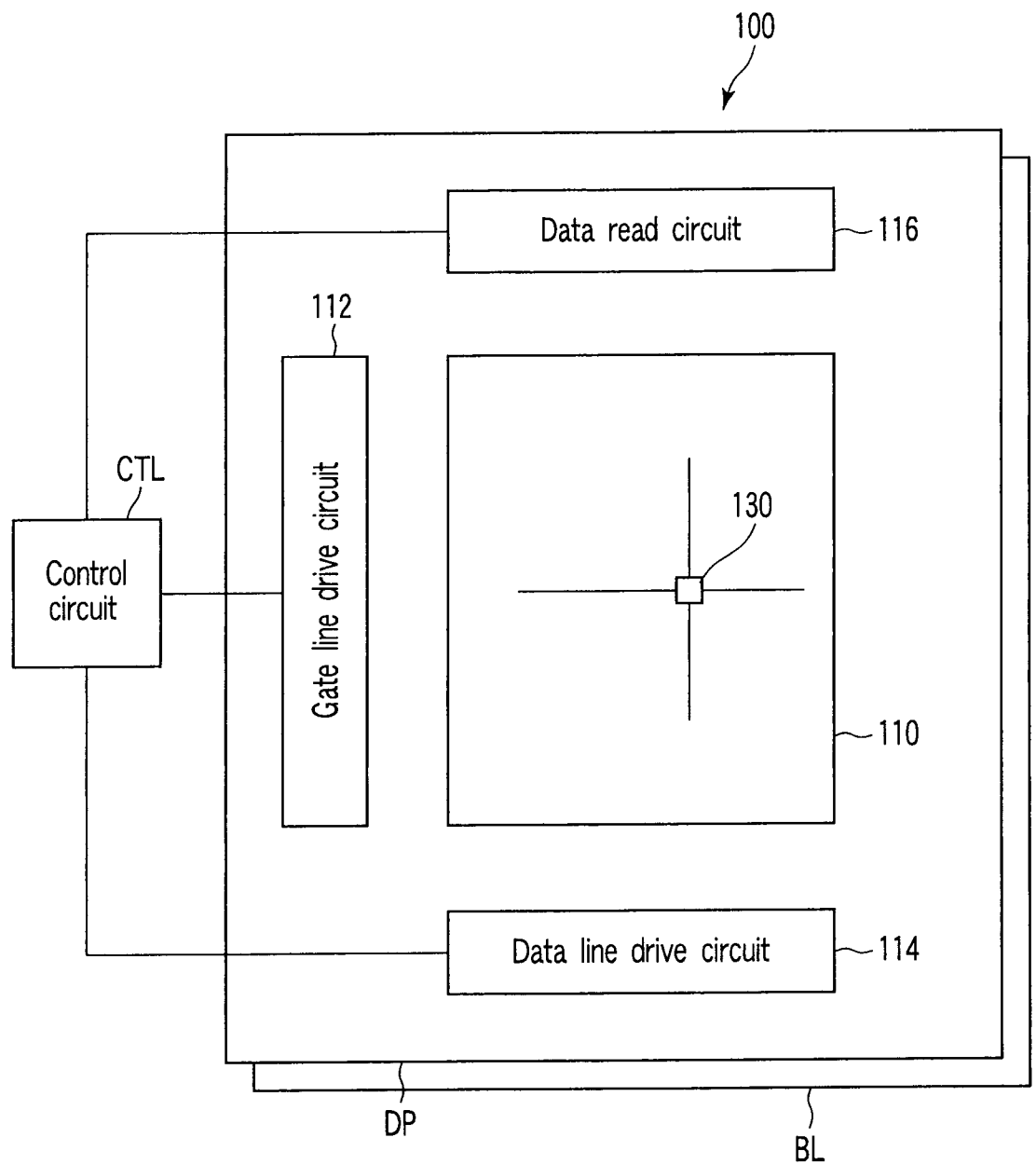
F I G. 1

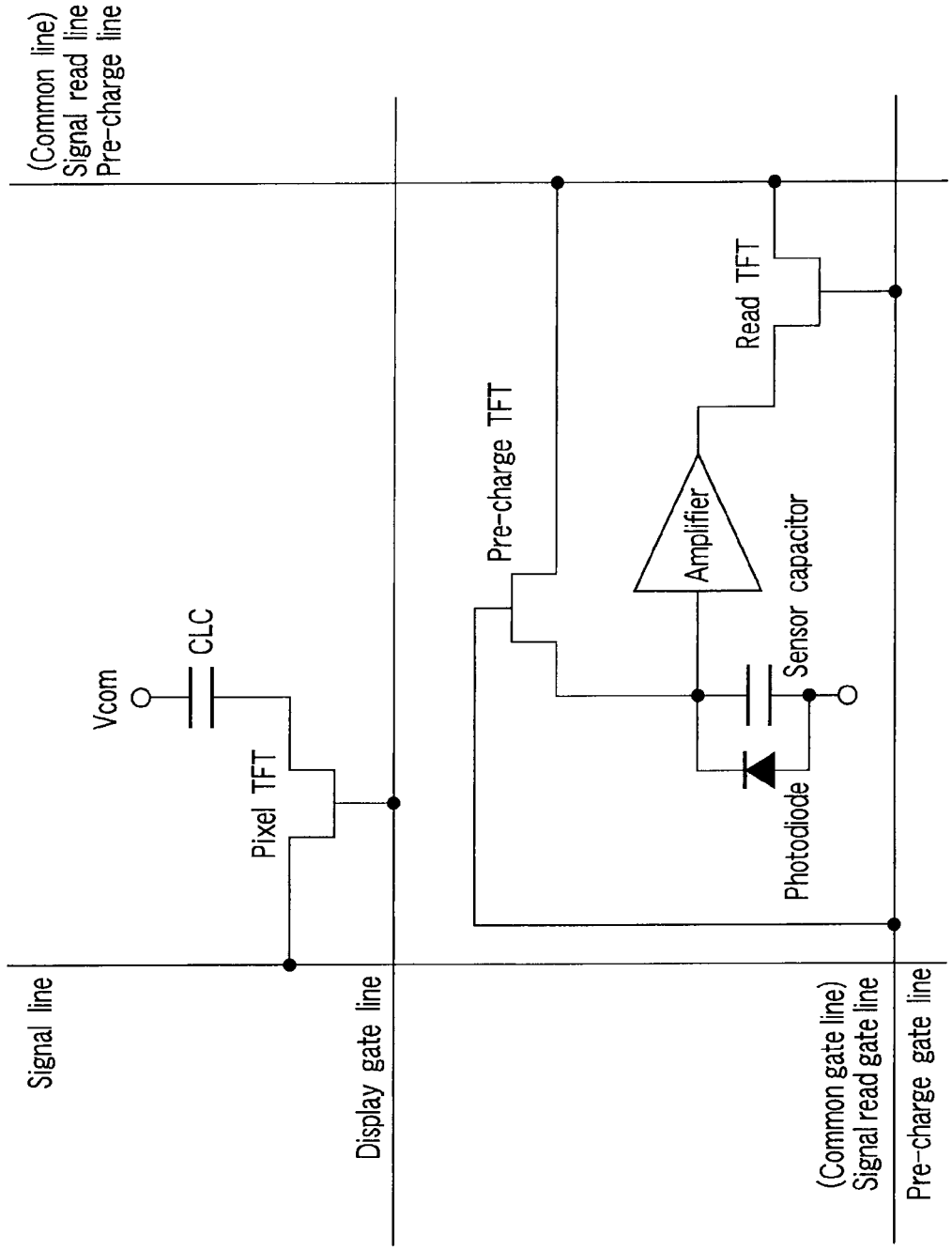
F I G. 10

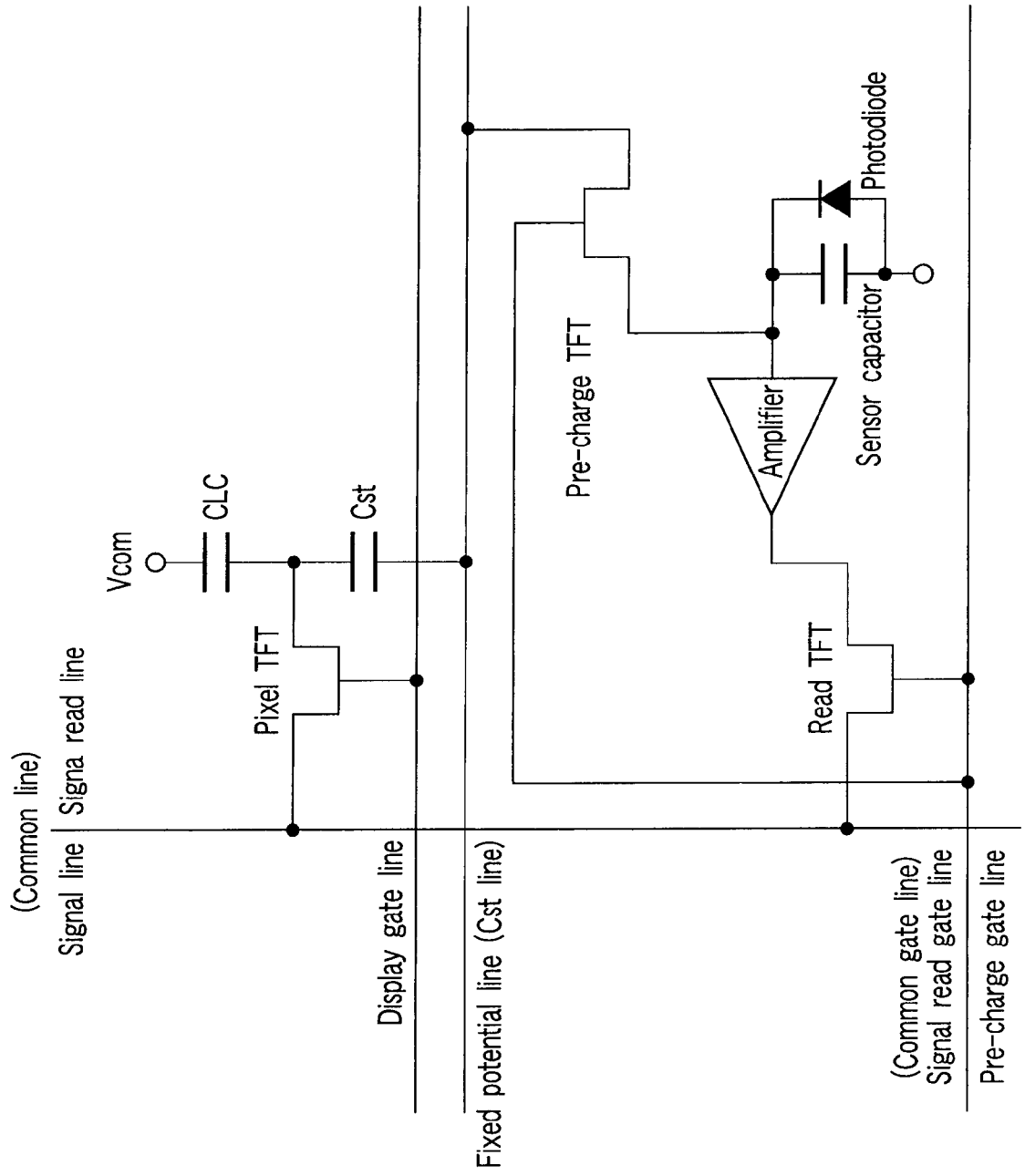
F I G. 12

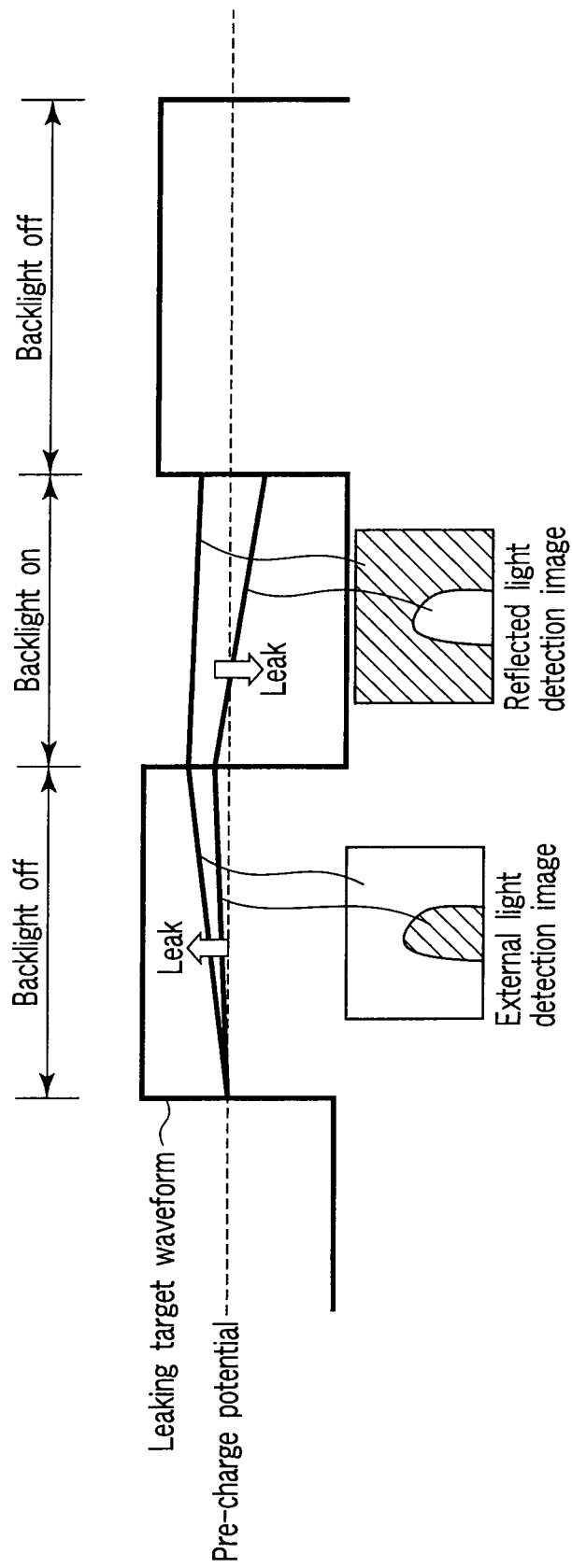
F I G. 15

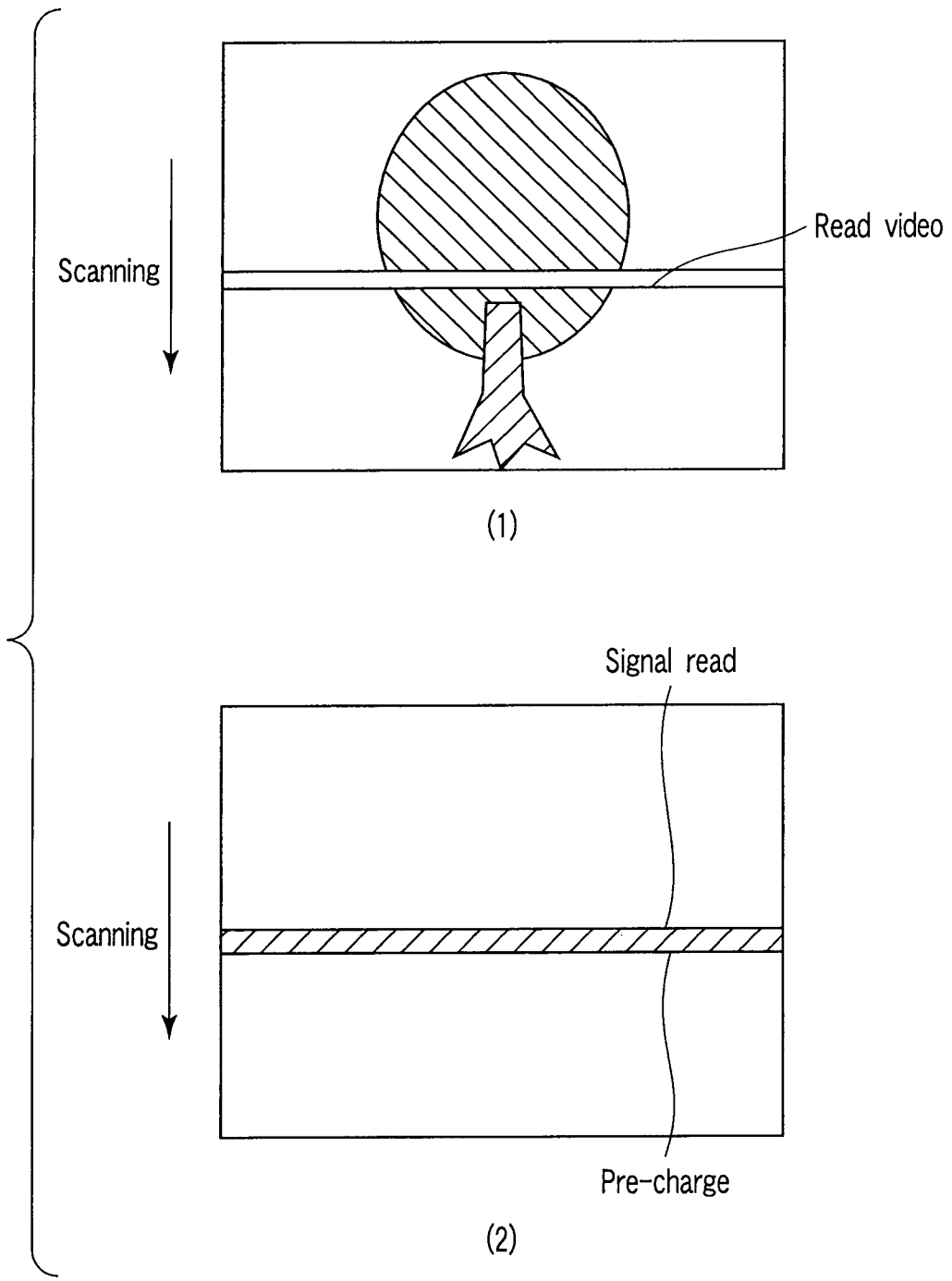
F I G. 20

LIQUID CRYSTAL DISPLAY APPARATUS

CROSS-REFERENCE TO RELATED APPLICATIONS

This application is based upon and claims the benefit of priority from prior Japanese Patent Applications No. 2007-039965, filed Feb. 20, 2007; and No. 2007-046081, filed Feb. 26, 2007, the entire contents of both of which are incorporated herein by reference.

BACKGROUND OF THE INVENTION

1. Field of the Invention

The present invention relates to a liquid crystal display apparatus.

2. Description of the Related Art

Generally a display apparatus using liquid crystal or the like is equipment for outputting image information, and it may also receive input information such as an image with the addition of an optical input function. This technology enables input/output of information and bidirectional exchange of information with a single device.

By using a liquid crystal display element provided with an optical input function, a fingerprint can be read by pressing a finger against a liquid crystal display panel, or a document may be pressed onto the liquid crystal display panel to read characters written thereon. Because a position which is touched with the finger or a pen on the display panel can be read optically, the liquid crystal display apparatus can be provided with the same function as a touch panel. Generally, although the display apparatus using liquid crystal or the like is equipment for outputting image information, it may also receive input information such as an image with the addition of the optical input function. This technology enables input/output of information or bidirectional exchange of information with a single device (Jpn. Pat. Appln. KOKAI Publication No. 2001-292276).

To achieve the touch panel function, upon start of read, a video displayed up to then is changed over to a read video for reading a target image. Because the read video needs to be a video which does not affect the reading of the image, it is, for example, an image in which a single color, for example, blue is displayed uniformly. Then, light from a light source such as a backlight BL is temporarily irradiated onto a document or the like on the liquid crystal display panel via the displayed read video. Then, light reflected from the document or the like is detected within the liquid crystal display panel and processed so as to read an image.

With the read video displayed, its information is read and then, display of the display video is restarted as required.

Therefore, in the conventional method, display of image information needs to be stopped temporarily for reading and then the display screen needs to be changed to such a read screen. Consequently, if it takes about several seconds to read any image, the display of image information is stopped in this time.

BRIEF SUMMARY OF THE INVENTION

A liquid crystal display apparatus according to a first aspect of the present invention comprises: a display panel configured to have a plurality of scanning lines for which liquid crystal display elements each containing an optical input device and a display pixel are arranged, respectively; a backlight configured to be arranged facing the display panel to illuminate the display panel; and a control part configured to control writing into the display pixel and reading of a detection signal of the optical input device, wherein the control part displays an external light detection image substantially shielding light from the backlight on the display pixels throughout a first period of a frame period, and displays a display image on the display pixels throughout a second period of the frame period.

A liquid crystal display apparatus according to a second aspect of the present invention comprises: a display panel configured to have a plurality of scanning lines for which liquid crystal display elements each containing an optical input device and a display pixel are arranged, respectively; a backlight configured to be arranged facing the display panel to illuminate the display panel; a backlight blinking part configured to blink the backlight; and a control part configured to control writing into the display pixel and reading of a detection signal of the optical input device, wherein the backlight is configured to be capable of blinking and the control part changes a reference potential synchronously with the blinking of the backlight.

A liquid crystal display apparatus according to a third aspect of the present invention comprises: a plurality of liquid crystal display elements which are arranged in a matrix on a substrate, and have respective optical sensors; a data driving unit which supplies a signal through signal lines arranged in correspondence with the columns of said plurality of liquid crystal display elements; a data read processing unit which reads and processes a signal corresponding to an amount of received light of the optical sensor through read lines arranged in correspondence with the columns of said plurality of liquid crystal display elements; a gate line driving unit which supplies a change-over signal for changing over the row of the liquid crystal display element to which a signal from the data driving unit is supplied through a plurality of gate lines arranged in correspondence with the rows of said plurality of liquid crystal display elements; and a control unit which controls the data driving unit, the data read processing unit and the gate line driving unit, wherein the control unit includes a video write control unit which controls to write a display video signal by successively scanning the liquid crystal display elements in a predetermined period within one field and write a read video signal by successively scanning the liquid crystal display elements in another period within the one field.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the schematic configuration of a liquid crystal display apparatus according to a first embodiment of the present invention;

FIG. 10 is a diagram showing the configuration of an equivalent circuit of a liquid crystal display element according to a fourth embodiment;

FIG. 12 is a diagram showing the configuration of an equivalent circuit of a liquid crystal display element according to a sixth embodiment;

FIG. 15 is a diagram showing changes in potential of a terminal of a sensor capacitor;

FIG. 20 is a view for explaining an image reading method of a tenth embodiment.

DETAILED DESCRIPTION OF THE INVENTION

Figure 2:
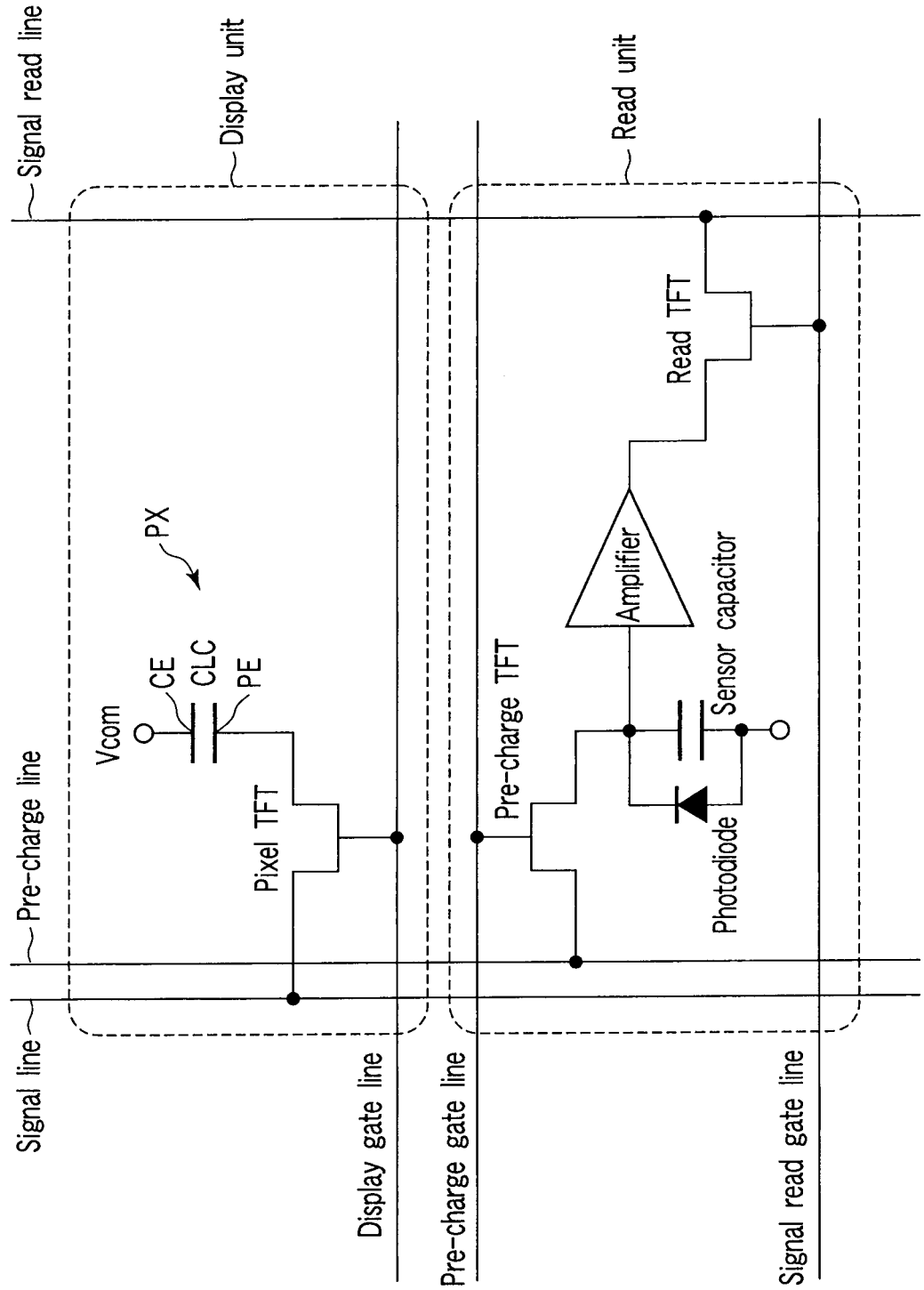
FIG. 2 is an equivalent circuit diagram showing the configuration of a liquid crystal display element with an optical input function (referred to as optical input function-equipped liquid crystal display element, in some cases) according to the first embodiment of the invention.

Hereinafter, embodiments of the present invention will be described in detail with reference to the accompanying drawings. In respective drawings, like reference numbers are attached to components having the same or similar function, and duplicated description thereof is omitted.

First Embodiment

FIG. 1 is a diagram showing the schematic configuration of a liquid crystal display apparatus according to a first embodiment of the present invention.

The liquid crystal display apparatus 100 includes a liquid crystal display panel DP having a plurality of optical input function-equipped liquid crystal display elements, a control circuit CTL for controlling the liquid crystal display panel DP and a backlight BL for illuminating the liquid crystal display panel DP.

The liquid crystal display panel DP includes a display area 110, a gate line drive circuit 112, a data line drive circuit 114 and a data read circuit 116.

A plurality of optical input function-equipped liquid crystal display elements 130 are arranged in the display area 110 in a matrix configuration. A plurality of gate lines (not shown) are arranged along the rows of the plurality of optical input function-equipped liquid crystal display elements. A plurality of data lines (not shown) are arranged along columns of the plurality of optical input function-equipped liquid crystal display elements 130.

The gate line drive circuit 112 drives the plurality of gate lines successively. The data line drive circuit 114 outputs data to a data line in accordance with driving of each gate line. The data read circuit 116 fetches and processes data read from each optical input function-equipped liquid crystal display element 130.

The control circuit CTL controls operations of the gate line drive circuit 112, the data line drive circuit 114 and the data read circuit 116.

FIG. 2 shows an equivalent circuit having the configuration of the optical input function-equipped liquid crystal display element according to the first embodiment of the invention.

Note that a display gate line, a pre-charge gate line and a signal read gate line shown in FIG. 2 are gate lines arranged along the rows of the plural liquid crystal display elements, and a signal line, a pre-charge line and a signal read line are data lines arranged along the columns of the plural liquid crystal display elements.

Then, each optical input function-equipped liquid crystal display element has a display unit and a read unit as shown in FIG. 2. Note that the read unit does not need to be provided on all the liquid crystal display elements because no high resolution is required to achieve the touch panel function and may be attached to any one of the plural liquid crystal display elements.

The display unit contains liquid crystal pixels PX, and a pixel TFT is connected to each liquid crystal pixel PX. A pixel electrode PE, a common electrode CE and a liquid crystal layer held therebetween constitute the liquid crystal pixel PX. The pixel TFT is a thin-film transistor as a switching device.

The pixel electrode PE is connected to a drain of the pixel TFT, and a common voltage Vcom is applied to the common electrode CE. A gate of the pixel TFT is connected to the display gate line, and a source-drain path is connected and formed between the signal line and the pixel electrode PE. The pixel TFT is conductive when it is driven through the display gate line so as to apply a potential of the signal line to the pixel electrode PE.

The read unit includes a photodiode, a sensor capacitor, an amplifier, a pre-charge TFT and a read TFT. The pre-charge TFT and the read TFT each are a thin-film transistor as a switching device.

The photodiode and the sensor capacitor are connected in parallel, and an end thereof is connected to a drain of the pre-charge TFT and an input terminal of the amplifier. A gate of the pre-charge TFT is connected to the pre-charge gate line, and the source-drain path is connected and formed between the pre-charge line and the input terminal of the amplifier. A gate of the read TFT is connected to the signal read gate line, and the source-drain path is connected and formed between the signal read line and an output terminal of the amplifier.

With such a configuration, when a predetermined amount of charge is pre-charged in, for example, the sensor capacitor, charge leaks in accordance with the amount of light which impinges upon the photodiode. By reading charge left in the sensor capacitor, light intensity at each position can be measured.

Next, the operation of the liquid crystal display apparatus will be described. Note that the control circuit CTL controls the operation of the liquid crystal display apparatus described later.

Figure 3:
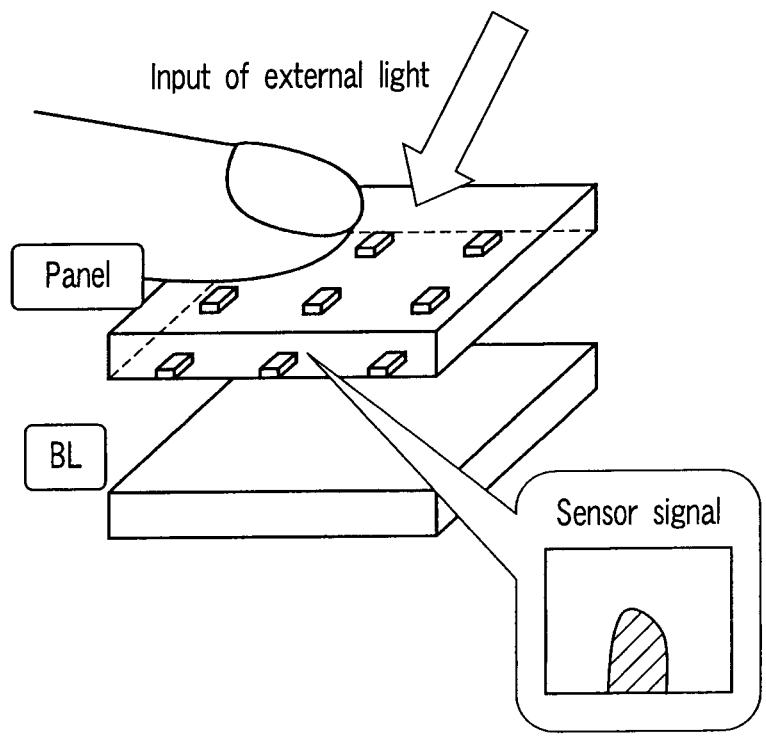
FIG. 3 is a view for explaining an optical input system with external light.
Figure 4:
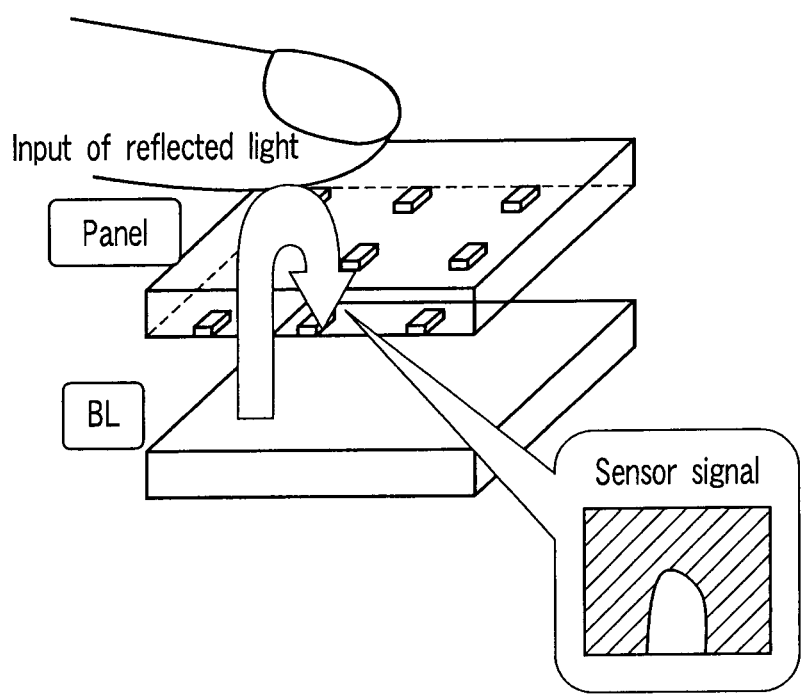
FIG. 4 is a view for explaining an optical input system with reflected light.

This embodiment adopts both an optical detection method with external light shown in FIG. 3 and an optical detection method with reflected light shown in FIG. 4.

In the optical detection method with external light shown in FIG. 3, external light irradiated on an area other than an area which is shaded by the finger tip position is detected, and only the area which is shaded by the finger tip position, that is, a touched position is recognized as black while the other area is recognized as white. Conversely in the optical detection method with reflected light shown in FIG. 4, reflected light of the backlight BL reflected by the finger tip position is detected so that as the finger image, only the touched portion is recognized as white.

According to this embodiment, display scanning is carried out twice within a frame, and optical detection scanning is carried out twice by optical detection with reflected light and optical detection with external light, so that input of information is achieved at the same time as the image display.

Figure 5:
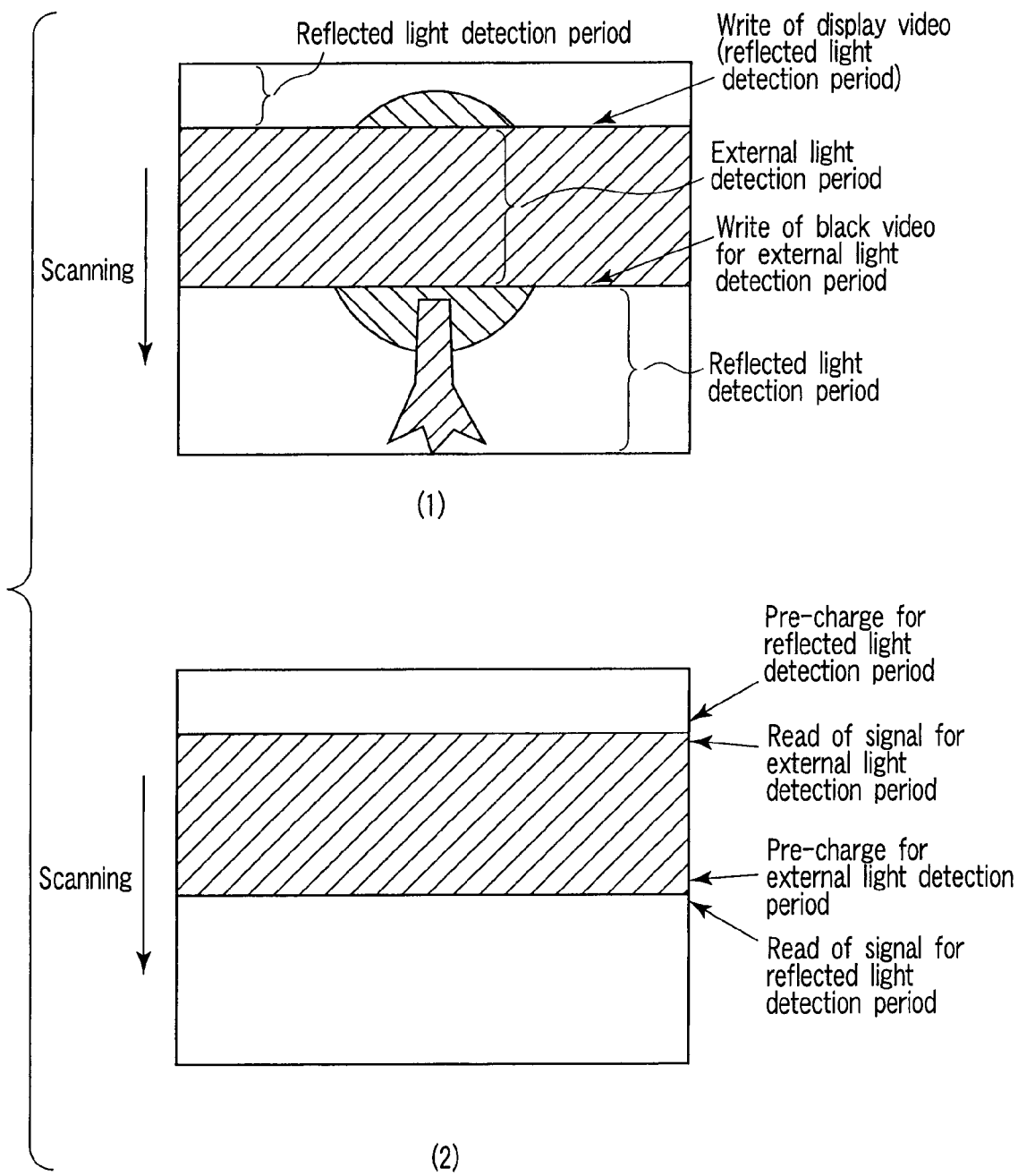
FIG. 5 is a view for explaining an image reading method according to the first embodiment of the invention.

FIG. 5 is a view for explaining an image reading method according to the first embodiment of the invention.

FIG. 5(1) shows an image displayed on the liquid crystal display panel DP at some point in time. A belt-like black video is displayed on part of the displayed video, and the belt-like black video is moved from up to down of the screen within a frame.

FIG. 5(2) shows a read operation timing. Substantially at the same time when the black display is started, the read unit of that line is pre-charged, and just before the black display is terminated, optically input information is read. Because even if the backlight BL is lit in the period of the black display, its light source light is intercepted by liquid crystal, it comes that the shadow of the touched portion by external light is input to the read unit. Although the image information is displayed after the black display is terminated, the pre-charge is carried out in this display period so as to read information input optionally just before the display is terminated. Because light of the black light BL is irradiated in the video display period, reflected light from the touched portion is input to the read unit.

Figure 6:
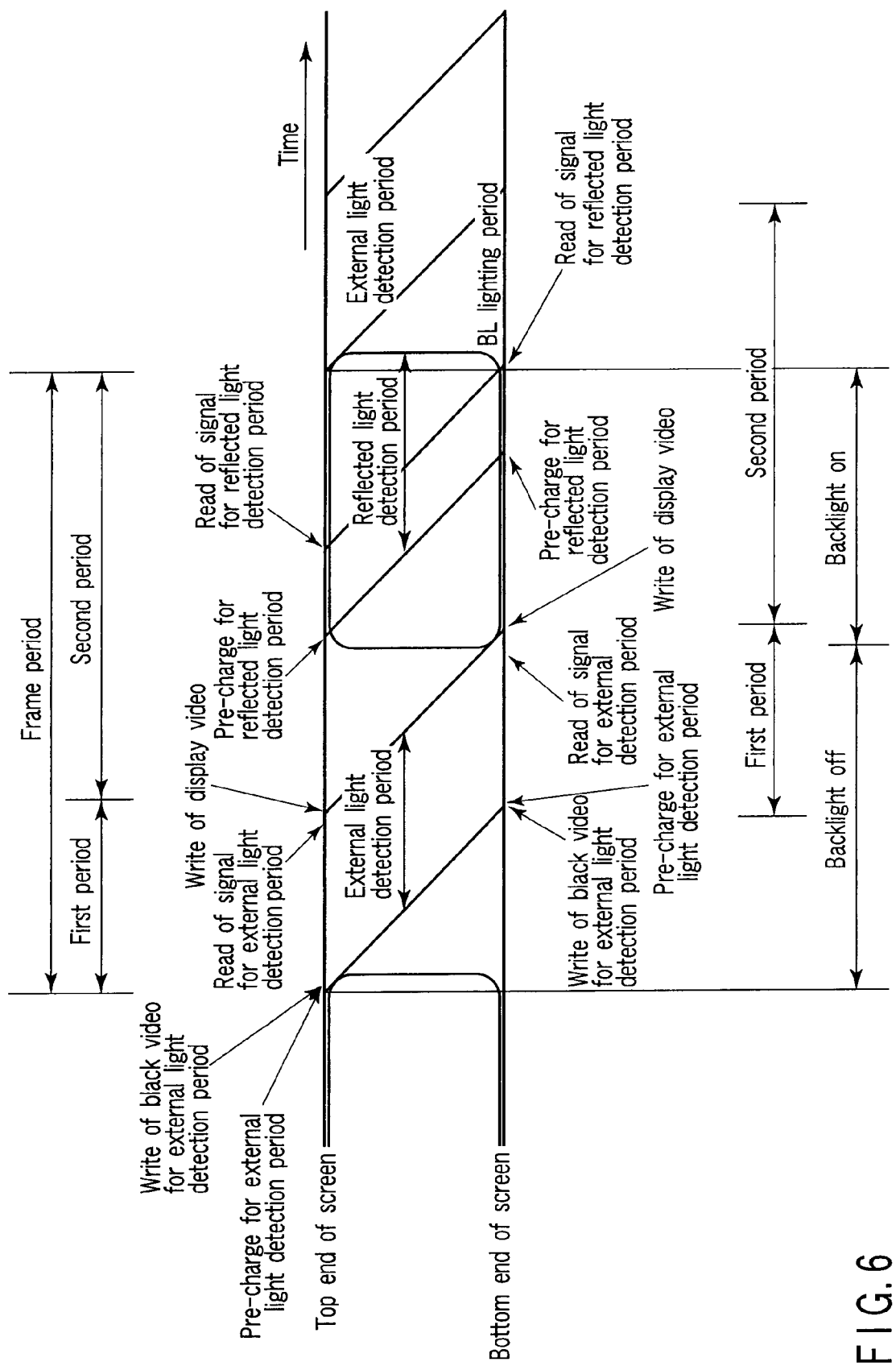
FIG. 6 is a time chart for explaining a read operation of the first embodiment.

FIG. 6 is a time chart for explaining the read operation of the first embodiment.

The abscissa axis in FIG. 6 indicates time, which progresses from the left to the right. The ordinate axis indicates a scanning position of the screen, in which the top end portion indicates a screen top end position while the lower end portion indicates a screen lower end position.

Each frame period is divided into a first period and a second period. The first period corresponding to ¼ frame period is allocated to the black display for detection of external light and preventing inversion of the OCB liquid crystal described later, and the second period corresponding to ¾ frame period is allocated to the reflected light detection and image display. When the external light detection period for all the scanning lines is terminated, the backlight BL is lit, and when a next external light detection period is started, the backlight BL is turned off.

A black image for external light detection is written into the pixel PX from a signal line with the display gate line in the active state throughout ¼ frame period of a frame period, and the pre-charge for external light detection is executed through the pre-charge line with the pre-charge gate line in the active state. This operation is achieved by scanning the display gate lines and pre-charge gate lines successively from the top end of the screen to the bottom end of the screen. Thus, a black video is displayed on the display screen successively from the top end to the bottom end thereof.

For each scanning line, the external light detection period is terminated after a predetermined time, for example, ¼ frame period elapses since the scanning of the display gate line and pre-charge gate line.

The external light detection period to each scanning line is equally set, and charge to be held in the sensor capacitor of the read unit is determined based on the amount of external light in the external light detection period. Although light of the backlight is intercepted by liquid crystal in which the black video is written in this external light detection period, it is preferable to turn off the backlight BL in order to improve the detection accuracy.

When the external light detection period is terminated, the external light detection signal is read out successively throughout the ¼ frame period through the signal read line with the signal read gate line in the active state.

Synchronously with this reading, image information for display is written into the pixel PX from the signal line with the display gate line in the active state throughout the ¼ frame period. This operation is achieved by scanning the display gate line successively from the top end of the screen to the bottom end of the screen. That is, the displayed video is displayed successively from the top end of the screen to the bottom end of the screen.

When the image information for display is displayed for each scanning line on the screen, the backlight BL is lit so as to achieve the image display. Further, synchronously with lighting of the backlight BL, the pre-charge for reflected light detection is carried out successively throughout the ¼ frame period from the scanning line at the top end position of the screen through the pre-charge line with the pre-charge gate line in the active state.

The reflected light detection period to each scanning line is set substantially equal and a voltage to be held in the sensor capacitor of the read unit is determined based on the amount of reflected light in this reflected light detection period.

After a predetermined reflected light detection period is terminated, the reflected light detection signal is read out through the signal read line with the signal read gate line in the active state. This operation is completed by the time when the frame period is terminated by successively scanning throughout the ¼ frame period from the top end of the screen to the bottom end of the screen.

Lighting of the backlight BL is continued until writing of a black video for the external light detection of a next frame is started. Then, synchronously with turning off of the backlight BL, the external light detection operation for a next frame period is started.

Note that the lighting period of the backlight BL is set in an interval from a time when writing of the image information is completed until writing of the black video for the external light detection period of a next frame is started in order to realize display of excellent image information having no brightness inclination within a plane.

As described above, a frame is divided into the first period and the second period, and quick response liquid crystal is necessary for displaying two images in each period. The reason is that no effect is achieved unless the displayed video can be followed even if the signal is rewritten. Thus, for example, the OCB liquid crystal capable of achieving quick response may be used.

The OCB liquid crystal has such a characteristic that even if transition to bend alignment occurs, reverse transition to splay alignment occurs again if a voltage applied state or voltage non-applied state not higher than a level at which energy of the splay alignment and energy of the bend alignment counter-balance lasts for a long period of time.

Conventionally to prevent the reverse transition from the bend alignment to the splay alignment, for example, a drive method for applying a large voltage to the liquid crystal in each field for displaying a 1-frame image has been adopted. In a normally white liquid crystal display panel, improvement of moving image visibility and prevention of reverse transition can be achieved using a pixel voltage which turns to black display as this voltage, which is called black insertion driving.

In this embodiment, the black video to be inserted for maintaining the bend alignment for the reverse transition prevention period is used as an external light detection black video in the first period. By such a driving, the OCB liquid crystal can achieve reading of information and image display with excellent moving image visibility without necessity of applying a reverse transition preventing voltage additionally.

Next, a method for processing a read detection signal will be described.

When an original document is input by fitting it to a panel face like a scanner, an influence of external light does not need to be considered. However, if it is used as a touch panel like this embodiment, the influence of the external light needs to be considered.

Figure 7:
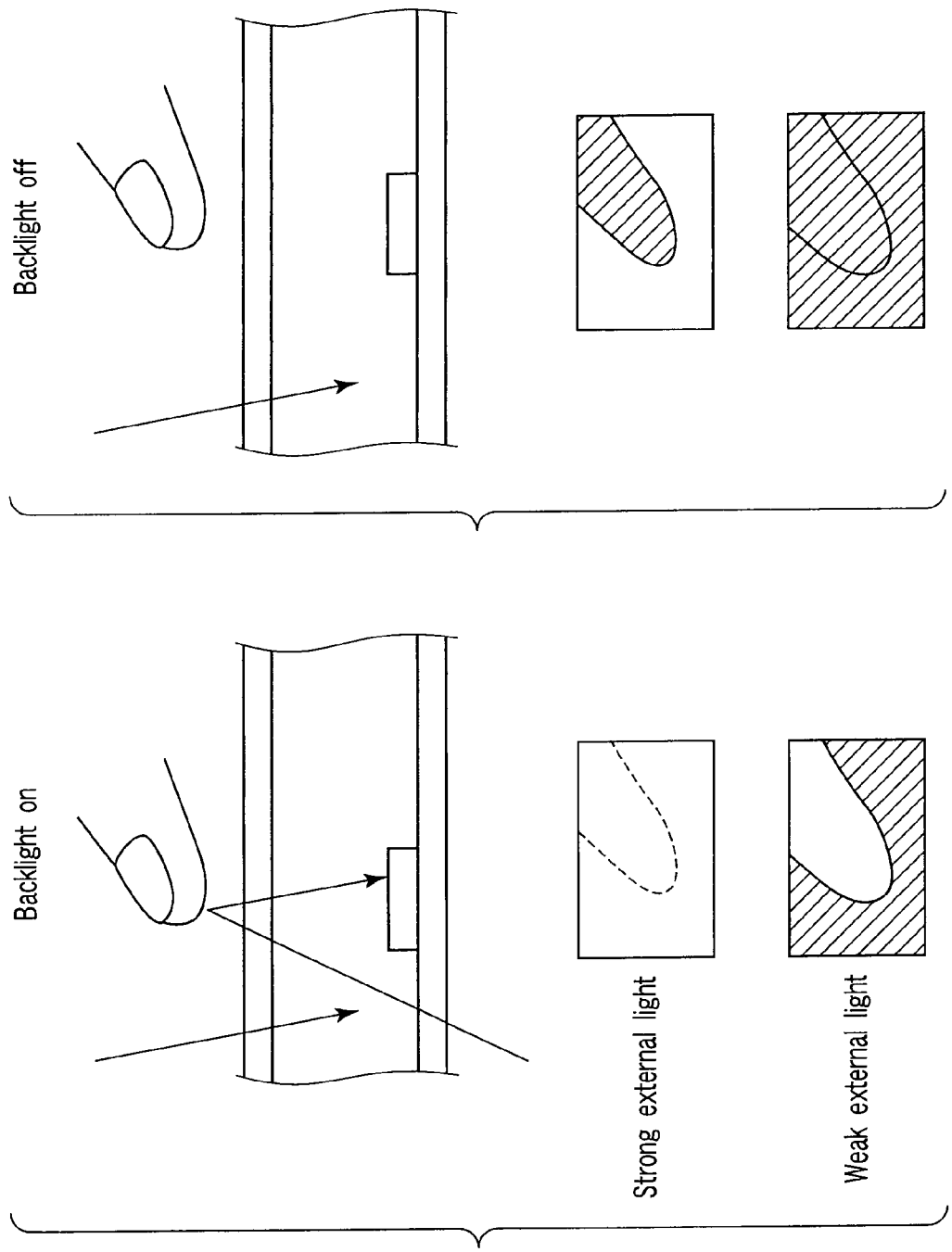
FIG. 7A is a view for explaining an influence between external light and backlight BL.
FIG. 7B is a view for explaining an influence between external light and backlight BL.

FIGS. 7A and 7B are views for explaining influences of the backlight BL. Assume that touching of the liquid crystal panel with the finger is made to recognize.

FIG. 7A shows a case where the backlight BL is turned on.

If external light is strong, the external light is intercepted by the finger at other portion than the shadow of the finger. For this reason, the portion is dark because the input of the external light to the read unit is small and other portion than the finger becomes light because the strong external light comes. When the backlight BL is turned on in this state, light source light from the backlight BL is reflected by the finger portion and this reflected light is input to the read unit, so that a light image having a low contrast is obtained.

Conversely, if the external light is weak, there is little influence of the external light, the light source light from the backlight BL is reflected by the finger, and this light is detected. Thus, an image having a high contrast is obtained such that the finger portion is a selectively light signal.

FIG. 7B shows a case where the backlight BL is off. Because if the external light is strong, the external light is intercepted by the shadow portion of the finger, an image having a high contrast is obtained such that the finger portion is of a signal of dark shadow.

Conversely, the finger shadow portion turns to black if the external light is weak. However, an image having a low contrast entirely can be obtained because the external light at other portions is weak also.

Because an image obtained is changed depending on the intensity of the external light, it might be difficult to detect an accurate position if only any one of an image in the external light detection period and an image in the reflected light detection period is used.

Although an image for use can be selected depending on the intensity of the external light by providing with, for example, an illuminance sensor, it is difficult to determine which image should be adopted if the intensity of the external light is not made evident. Of course, it is permissible to select and operate any one of the first and second periods based on a detection result of the illuminance sensor.

According to this embodiment, an accurate finger input pattern is acquired by calculating two kinds of detection images obtained in the first period (reflected light detection) and the second period (external light detection).

These detection images have (i) a negative image relationship between an external light pattern and a reflected light pattern and (ii) a clear finger input pattern is obtained in any one of the obtained images depending on the intensity of external light. Thus, by executing logical operation in order to make evident white/black (binary) images of both the images, a desired pattern can be obtained.

For example, after each image is binarized, the image when the backlight BL is turned on is reversed. Then, an AND operation between the reversed image and an image when the backlight BL is turned off is executed. By this logical operation, an image of a blacked finger is obtained.

Alternatively, these images are binarized and the image when the backlight BL is turned off is reversed. Then, OR operation between the reversed image and the image when the backlight BL is turned on is executed. By this logical operation, an image of a whitened finger is obtained.

These images are binarized and EOR (exclusive OR) operation is executed. By this logical operation, an image of a blacked finger is obtained.

Further, the binarization may be performed following a result of calculating a difference in brightness between the both images as well as the above-described logical operation. Or the binarization may be performed following a result of calculating a quotient of the both images. The reason is that the both have actions of stressing light and shadow.

It is permissible to combine and execute the above-described processings.

According to the first embodiment, three kinds of gate lines (display gate line, pre-charge gate line, and signal read gate line) are provided. In case of a liquid crystal device using amorphous silicon, it is necessary to prepare three kinds of the gate drivers and thus, the quantity of pads to be mounted outside is increased, thereby inducing an increase in external dimension. In the first embodiment, a low-temperature polysilicon is used and a gate driver is incorporated in glass. Likewise, a detection circuit or the like needs to be configured on a source side for supplying a video and it is formed of a low-temperature polysilicon circuit. A low-temperature polysilicon active matrix method is suitable to configure the first embodiment.

In the above embodiment, scanning is performed in ¼ period. By increasing the scanning speed, a time aperture ratio can be improved, and particularly by using an OCB liquid crystal, improvement of the time aperture ratio can be achieved.

Second Embodiment

In a second embodiment, a reflected light detection period different from that of the first embodiment is provided. Like reference numbers are attached to the same components as the first embodiment, and detailed description thereof is omitted.

Figure 8:
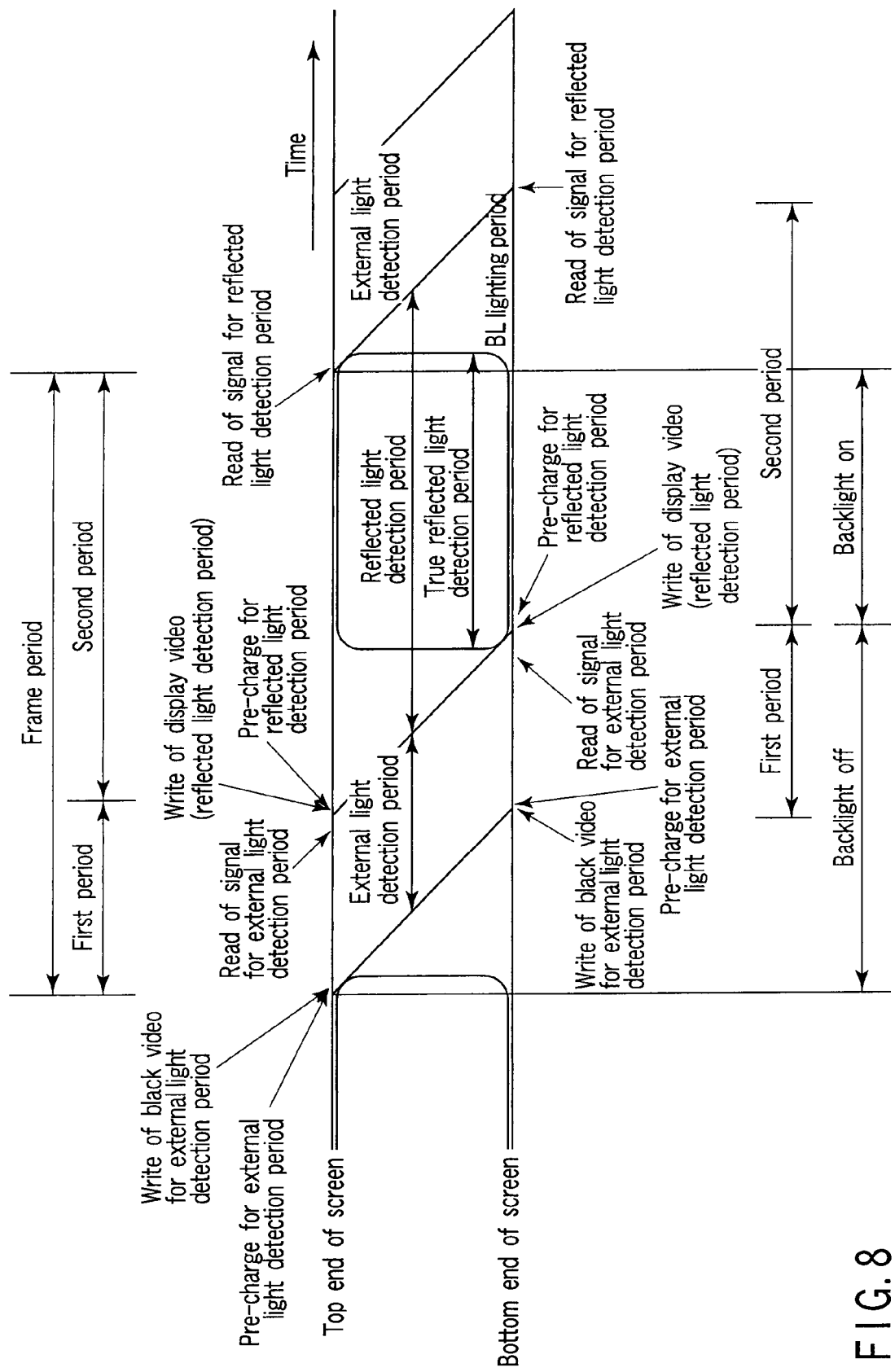
FIG. 8 is a time chart for explaining a read operation of a second embodiment.

FIG. 8 is a time chart for explaining a read operation of the second embodiment.

The abscissa axis in FIG. 8 indicates time, which progresses from the left to the right. The ordinate axis indicates a scanning position of the screen, in which the top end position indicates a screen top end position while the bottom end portion indicates a screen bottom end position.

Like the first embodiment, each frame period is divided into a first period and a second period. The first period corresponding to ¼ frame period is allocated to the black display for detection of external light and preventing inversion of the OCB liquid crystal described later, while the second period corresponding to ¾ frame period is allocated to the reflected light detection and image display. Because in this embodiment, the entire period of the second period is allocated to the reflected light detection period, a high S/N ratio is obtained, whereby detection accuracy is improved.

Like the first embodiment, a black video for external light detection is written into the pixel PX from the signal line with the display gate line in the active state throughout ¼ frame period, and the pre-charge for external light detection is executed through the pre-charge line with the pre-charge gate line in the active state. This operation is achieved by scanning the display gate lines and pre-charge gate lines successively from the top end of the screen to the bottom end of the screen. Thus, a black video is displayed on the display screen successively from the top end to the bottom end thereof.

The external light detection period for each scanning line is set to ¼ frame period, and a voltage to be held in the sensor capacitor of the read unit is determined based on the amount of external light in this external light detection period. The backlight BL is kept off until the external light detection period to all the scanning lines is terminated.

Synchronously with the termination of the external light detection period, the external light detection signal is read out to the signal read line with the signal read gate line in the active state.

At the same time when the above-mentioned reading is carried out, image information for display is written into the pixel PX from the signal line with the display gate line in the active state throughout ¼ frame period, and the pre-charge for reflected light detection is executed through the pre-charge line with the pre-charge gate line in the active state.

This operation is achieved by scanning from the top end of the screen to the bottom end of the screen. When writing of image information for display to each scanning line is completed, the backlight BL is turned on.

When the pre-charge for reflected light detection is completed and ¾ frame period elapses, the reflected light detection signal is read out successively to the signal read line with the signal read gate line in the active state throughout the ¼ frame period. This operation is also executed by scanning from the top end of the screen to the bottom end of the screen successively. To achieve excellent image information display without any brightness inclination in the plane, the lighting of the backlight BL is set in a period from a time when writing of the image information is completed until writing of the black video for the external light detection period of a next frame is started.

Next, a method for processing a read-out detection signal will be described.

In the second embodiment, a period in which the backlight BL is off and a period in which the backlight is on exist in the reflected light detection period in each read unit.

Thus, a signal detected in the reflected light detection period is a signal produced by combining a signal when the backlight BL is off and a signal when the backlight BL is on as shown in FIGS. 7A and 7B.

The liquid crystal panel is in a transmission state only when the backlight BL is lit in the reflected light detection period. For this reason, it is considered that, in the reflected light detection period in which the backlight BL is off, the same optical input as in the external light detection period is carried out. Then, the ratio of the period in which the backlight BL is off in the reflected light detection period is constant in any read unit. Accordingly, a predetermined relation is established between the amount of charge discharged from the sensor capacitor in the reflected light detection period in which the backlight BL is off and the amount of charge discharged from the sensor capacitor in the external light detection period. Then, by correcting a signal detected in the reflected light detection period with a signal detected in the external light detection period, a detection signal in the period in which the backlight BL is off can be calculated.

Because subsequent processing is the same as the first embodiment, detailed description thereof is omitted.

Third Embodiment

A third embodiment is different from the second embodiment in the on/off period of the backlight BL. Thus, like reference numbers are attached to the same components as the second embodiment, and detailed description thereof is omitted.

Figure 9:
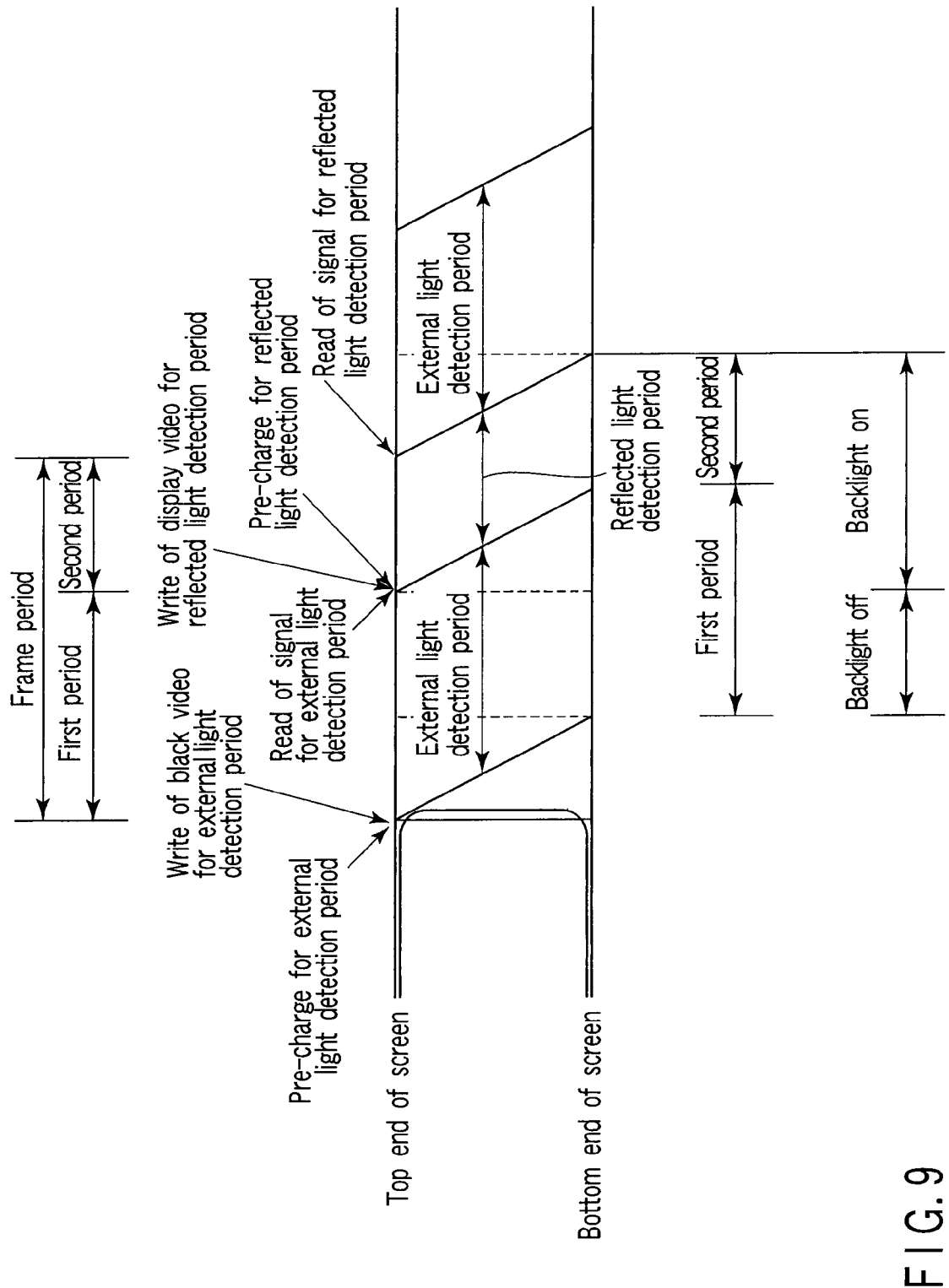
FIG. 9 is a time chart for explaining a read operation of a third embodiment.

FIG. 9 is a time chart for explaining a read operation of the third embodiment.

In the third embodiment, the backlight BL is lit at a timing when reading of a signal for external light detection period is executed at the top end of the screen and turned off at a timing when reading of the signal for external light detection period is executed at the bottom end of the screen.

Thus, although the backlight BL is lit in the external light detection period also, illumination on the finger by the backlight BL can be neglected because black display is adopted in this period. Thus, an influence on the detection signal does not need to be taken into account.

Because in this embodiment, two kinds of the detection images, of the reflected light detection period and external light detection period, can be obtained, a finger input pattern is calculated by calculating these two types of the images. Because this calculation method has been described in the first embodiment, duplicated description thereof is omitted.

Fourth Embodiment

A fourth embodiment is different from the first embodiment in the configuration of the liquid crystal display element. Like reference numbers are attached to the same components as the first embodiment, and detailed description thereof is omitted.

FIG. 10 is a diagram showing the configuration of an equivalent circuit of the liquid crystal display element of the fourth embodiment.

In the fourth embodiment, the pre-charge line and the signal read line are shared as a common line, and the pre-charge gate line and the signal read gate line are shared as a common gate line. With this configuration, the quantity of wires can be reduced by two, whereby the aperture ratio is improved greatly.

To achieve this operation, a pre-charge gate pulse and a signal read gate pulse are output selectively from the common gate line, and corresponding to this, pre-charge supply and signal read are changed over alternately for each horizontal scanning period in the common line for pre-charge and signal read, which is a vertical wiring. Accordingly, although the scanning period is twice that in the above-described embodiment, the time aperture ratio can be prevented from dropping by doubling the scanning speed at this time.

Fifth Embodiment

A fifth embodiment is different from the first embodiment in the configuration of the liquid crystal display element. Like reference numbers are attached to the same components as the first embodiment, and detailed description thereof is omitted.

Figure 11:
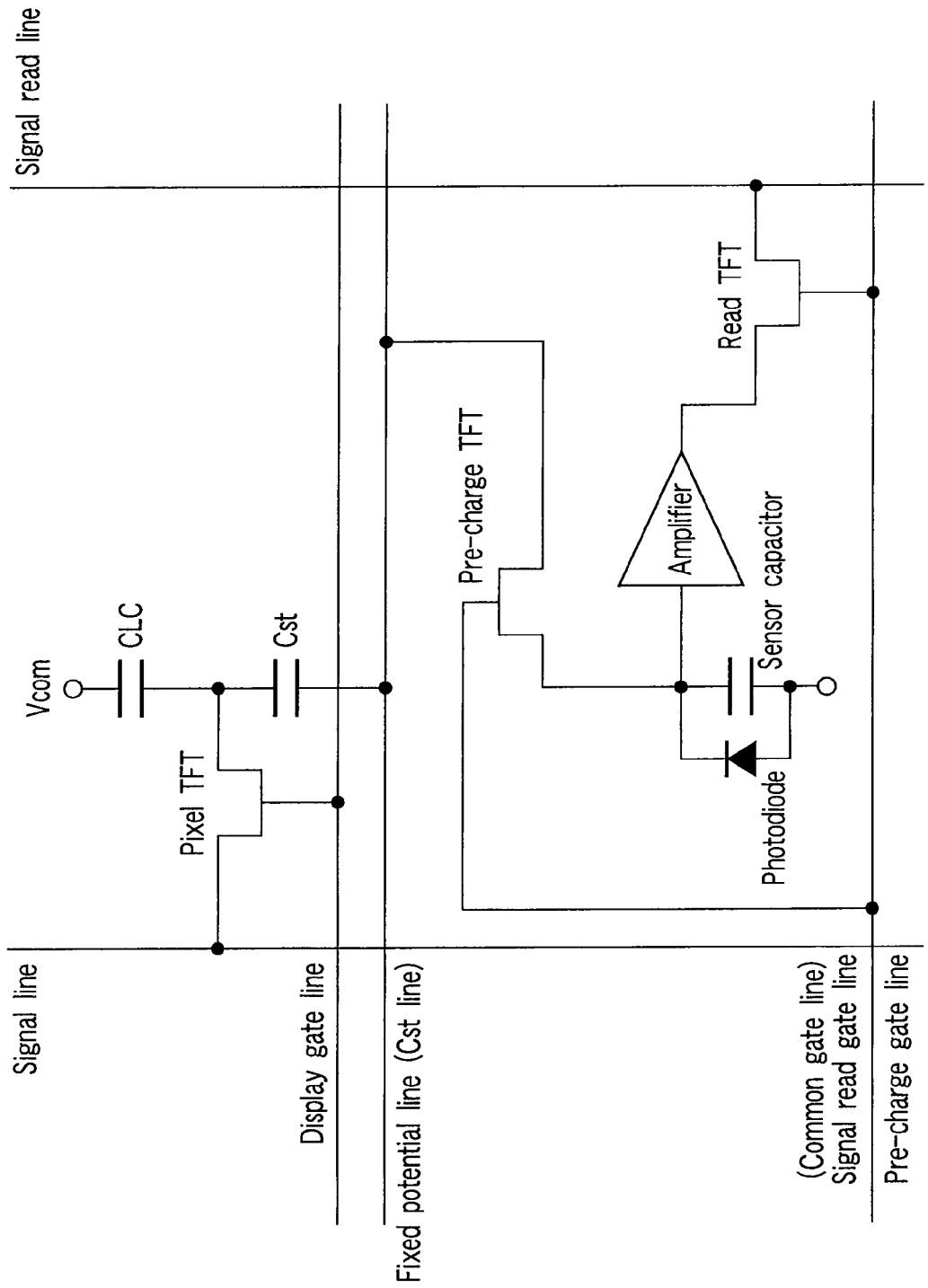
FIG. 11 is a diagram showing the configuration of an equivalent circuit of a liquid crystal display element according to a fifth embodiment.

FIG. 11 is a diagram showing the configuration of an equivalent circuit of the liquid crystal display element of the fifth embodiment.

In the fifth embodiment, the pre-charge gate line and the signal read gate line are shared as a common gate line, and a Cst line for use in liquid crystal display is used as the pre-charge line. With this configuration, the quantity of wirings can be reduced, whereby the aperture ratio is improved greatly.

Because the pre-charge line acts to charge the sensor capacitor by fixed charge, it is permissible to use a fixed pre-charge power supply. In the fifth embodiment, the Cst line and pre-charge line for use in liquid crystal display are changed over for use.

Charge corresponding to a pixel voltage is accumulated in the auxiliary capacitor Cst. By applying a compensation voltage Ve to the Cst line connected to the auxiliary capacitor Cst at a predetermined timing, changes of a pixel voltage due to influences of a parasitic capacitance when the pixel TFT turns non-conductive can be substantially canceled.

In the fifth embodiment, the pre-charge gate pulse and the signal read gate pulse from the common gate line are changed over for scanning, and corresponding to this, a pre-charge potential is supplied to a fixed potential line so as to read out a signal from the read unit to the signal read line.

When the pre-charge voltage is supplied to the fixed potential line (Cst line), a changing device (not shown) changes over the fixed potential line (Cst line) to a power supply for pre-charge (not shown). After the pre-charge is terminated, the changing device (not shown) changes over connection of the fixed potential line (Cst line) to a read IC in its original state.

Sixth Embodiment

A sixth embodiment is different from the first embodiment in the configuration of the liquid crystal display element. Like reference numbers are attached to the same components as the first embodiment, and detailed description thereof is omitted.

FIG. 12 is a diagram showing the configuration of an equivalent circuit of the liquid crystal display element according to the sixth embodiment.

In the sixth embodiment, the signal line and signal read line of the fifth embodiment are shared. With this configuration, the quantity of wires can be reduced, whereby the aperture ratio is improved greatly.

Because in the sixth embodiment, three signals or a display signal, a read display signal and a read signal flow in the common line, the three functions are changed over in time series. Consequently, the vertical wiring satisfies a purpose with a single system.

By further accelerating the sharing, the display gate line, the pre-charge gate line and the signal read gate line can be shared. At this time, a gate line which shares four roles for display signal supply, read display signal supply, pre-charge and signal read needs to be realized, and the four types of the signals need to be changed over rapidly for scanning. Consequently, the horizontal wiring can be summarized to a single system.

Seventh Embodiment

A seventh embodiment is different from the first embodiment in the configuration of the liquid crystal display element and the drive method therefor. Like reference numbers are attached to the same component as the first embodiment, and detailed description thereof is omitted.

Figure 13:
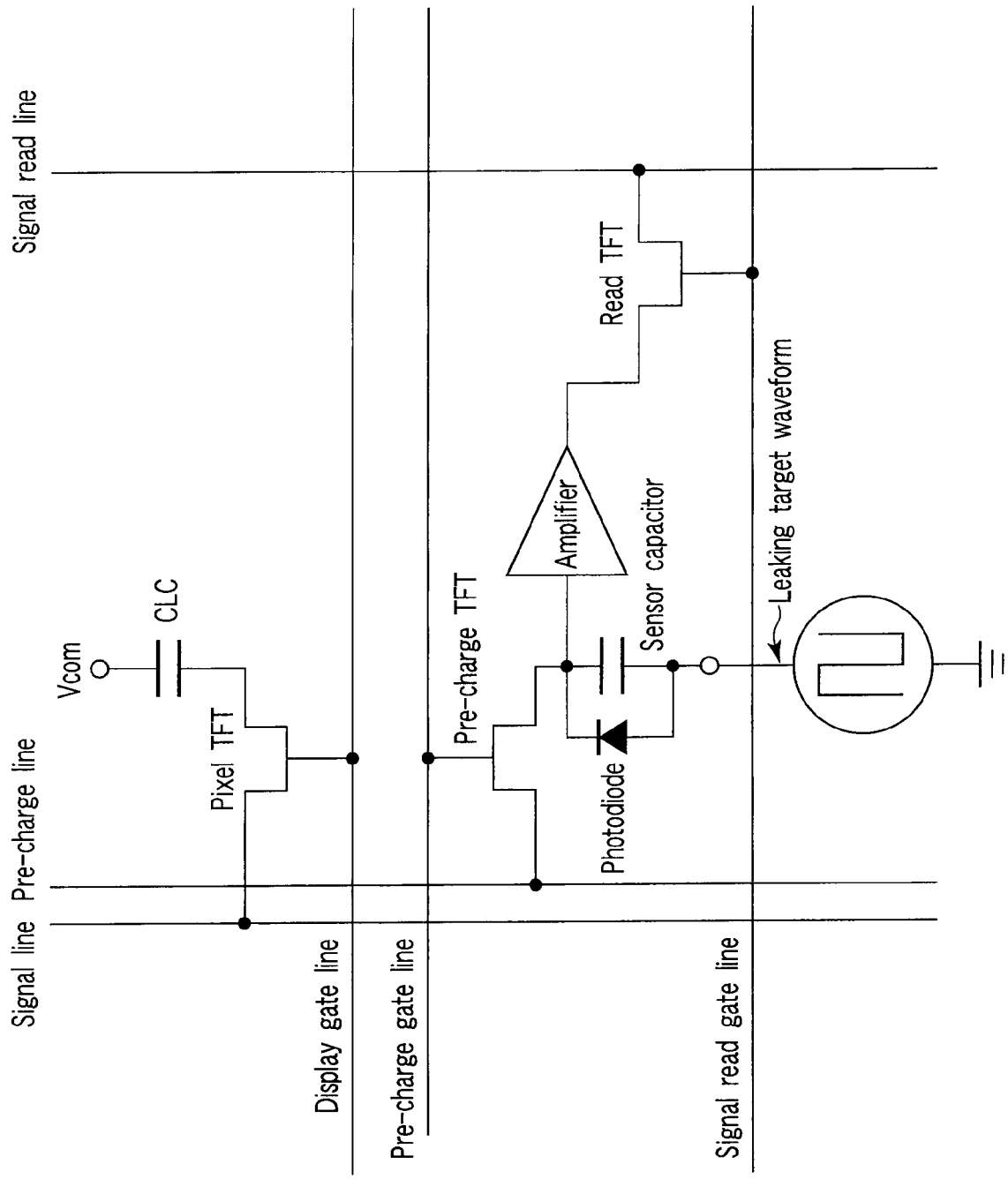
FIG. 13 is a diagram showing the configuration of an equivalent circuit of a liquid crystal display element according to a seventh embodiment.

FIG. 13 is a diagram showing the configuration of an equivalent circuit of the liquid crystal display element of the seventh embodiment.

In the circuit configuration of the liquid crystal display element shown in FIG. 2 of the seventh embodiment, a potential application circuit for controlling a potential direction in which charge leaks is connected to a terminal of the sensor capacitor. The operation of the potential application circuit will be described later.

Figure 14:
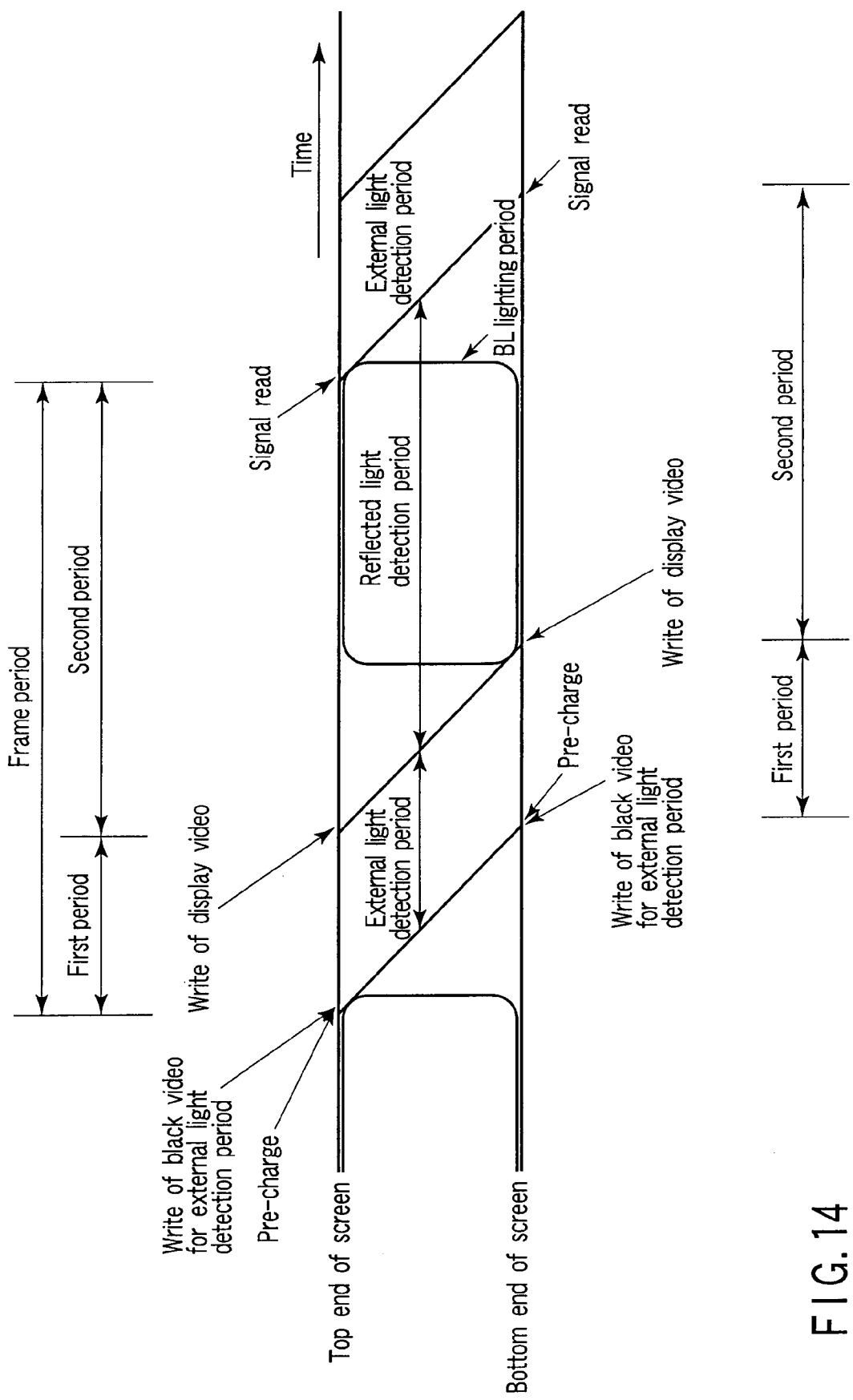
FIG. 14 is a time chart for explaining a read operation of the seventh embodiment.

FIG. 14 is a time chart for explaining a read operation of the seventh embodiment.

According to this time chart, even when the external light detection period is terminated, reading of signal and pre-charge for reflected light detection are not executed. Then, when the backlight BL is turned on, substantially the reflected light detection period is started and signal read is executed at a timing when the backlight BL is turned off. This embodiment is different from the above respective embodiments in that the signal read is carried out once in, for example, a frame period including the external light detection period and the reflected light detection period. Then, as described later, this embodiment has a feature in that the reference potential of a terminal of the sensor capacitor is changed synchronously with the backlight BL on/off.

FIG. 15 is a diagram showing a potential change of the terminal of the sensor capacitor.

The abscissa axis in FIG. 15 indicates a time, which progresses from the left to the right. The ordinate axis indicates a potential of a terminal of the sensor capacitor.

When the pre-charge for external light detection is executed, the terminal of the sensor capacitor is set to a pre-charge potential. Then, when the backlight BL is turned off, the potential application circuit applies a high potential to the terminal of the sensor capacitor. Consequently, in FIG. 15, a "leaking target waveform" increases in a step like fashion.

If the charge in the sensor capacitor leaks due to application of a high potential, the potential increases toward the high potential, with the result that the terminal potential of the sensor capacitor increases with a passage of time in correspondence with the amount of received light. At this time, the amount of potential change at a portion receiving external light directly is larger than the amount of potential change at a shadow portion.

Next, when the backlight BL is turned on, the potential application circuit applies a low potential to a terminal of the sensor capacitor. As a result, the "leaking target waveform" decreases in a step-like fashion in FIG. 15.

When charge in the sensor capacitor leaks due to application of a low potential, the potential decreases toward the low potential, with the result that the terminal potential of the sensor capacitor decreases with a passage of time corresponding to the amount of received light. At this time, the amount of potential change at a portion receiving reflected light is larger than the amount of potential change at a shadow portion.

As a result, when a signal is read out at a timing when the backlight BL is turned off, a pattern when the backlight is on and a pattern when the backlight is off are reverse to each other. However, by reversing the setting of potential corresponding thereto, this image is corrected, so that the finger image and surrounding image can be separated easily.

This embodiment has such an advantage that reading of a signal can be completed by a single time in a frame period, and only a single memory can achieve the purpose in order to store the read-out signal or the memory can be omitted. In this embodiment, processing performed by the logical operation in the above-described respective embodiments is executed in an analog manner by changing over the potential of a leaking target within the panel.

The present invention permits the backlight to be modulated with high frequency and a characteristic frequency component to be detected synchronously therewith. In this case, the detection sensitivity can be intensified extremely. At this time, blinking of the backlight does not need to be performed at a frame frequency and may be combined with high frequency pulse width modulation (PWM modulation) for modulating the light intensity of the backlight. Usually, the frequency at this time is a high frequency of 400 Hz or higher.

In the above-described embodiments, the external light detection period and reflected light detection period are provided in a frame period. Hereinafter, an embodiment in which a frame period is constituted of any one detection period will be described.

The embodiment below may be adapted as, for example, a touch panel of a reflected light liquid crystal display apparatus using no backlight and in order to read a document loaded on the display surface of a transmission liquid crystal display apparatus having a backlight.

Eighth Embodiment

An image reading method of an eighth embodiment uses the liquid crystal display element having the configuration shown in FIG. 2.

Figure 16:
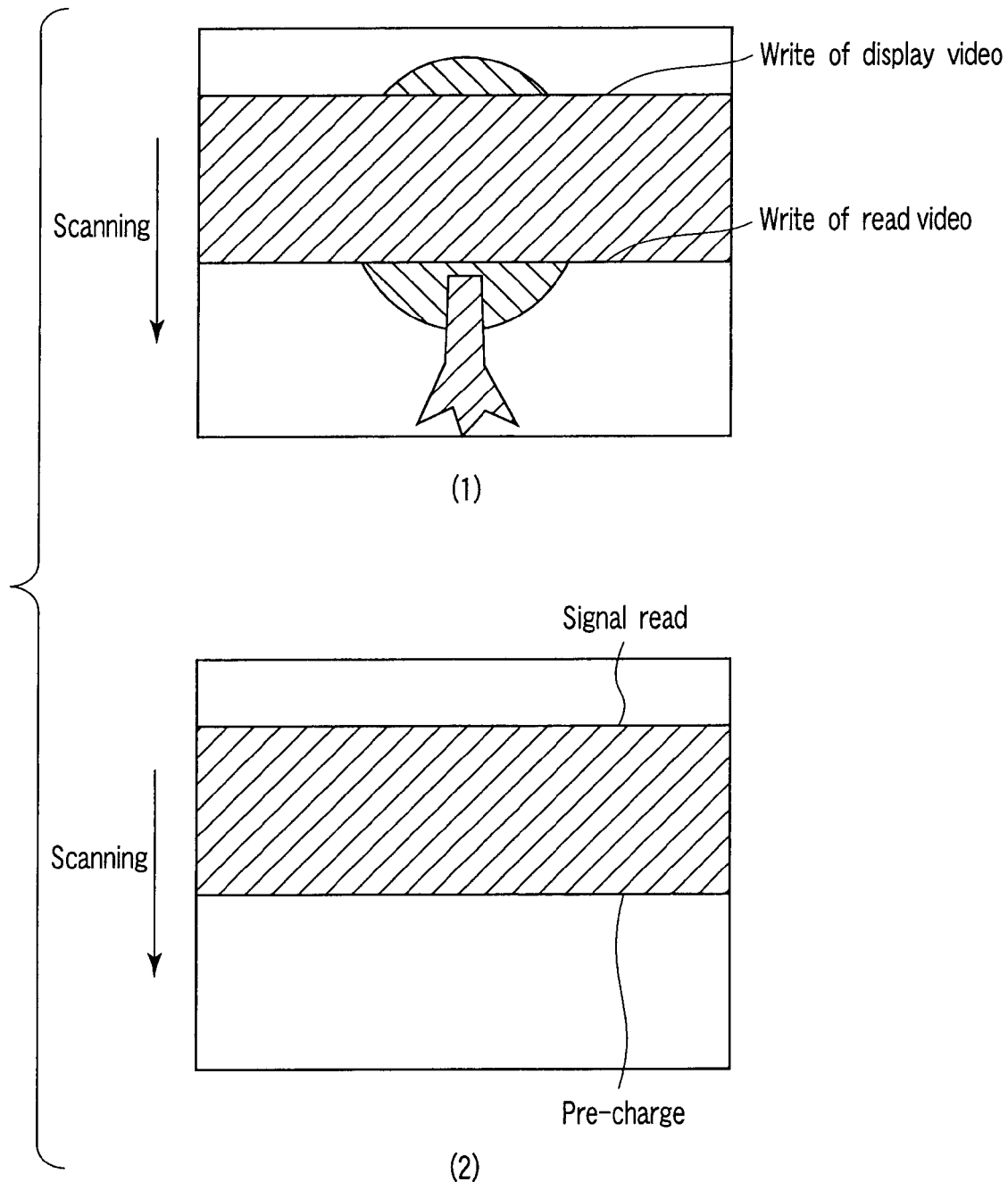
FIG. 16 is a view for explaining an image reading method of an eighth embodiment.

FIG. 16 is a view for explaining the image reading method of the eighth embodiment of the invention.

FIG. 16(1) shows a screen at some point in time. A belt-like read video is displayed on part of the displayed video and the belt-like read video moves from the top end to the bottom end within a single field.

To achieve this operation, two gate signals for display are used to scan a single field. A display video is written in accordance with input of a first display gate signal, and a read video is written in accordance with input of a next display gate signal. A period from a time when the first display gate signal is input until the next display gate signal is input is a video display period. By adjusting this timing, that is, an interval between a start pulse of the first display gate signal and a start pulse of the next display gate signal, the length of the read period and the length of the video display period can be controlled freely.

FIG. 16(2) shows a screen for explaining the read operation.

Because in the above configuration, the read image belt is scanned, the pre-charge is implemented substantially corresponding to a timing of writing the read image. Then, a signal is read out at a timing at which the read signal is changed over to a video display image.

Figure 17:
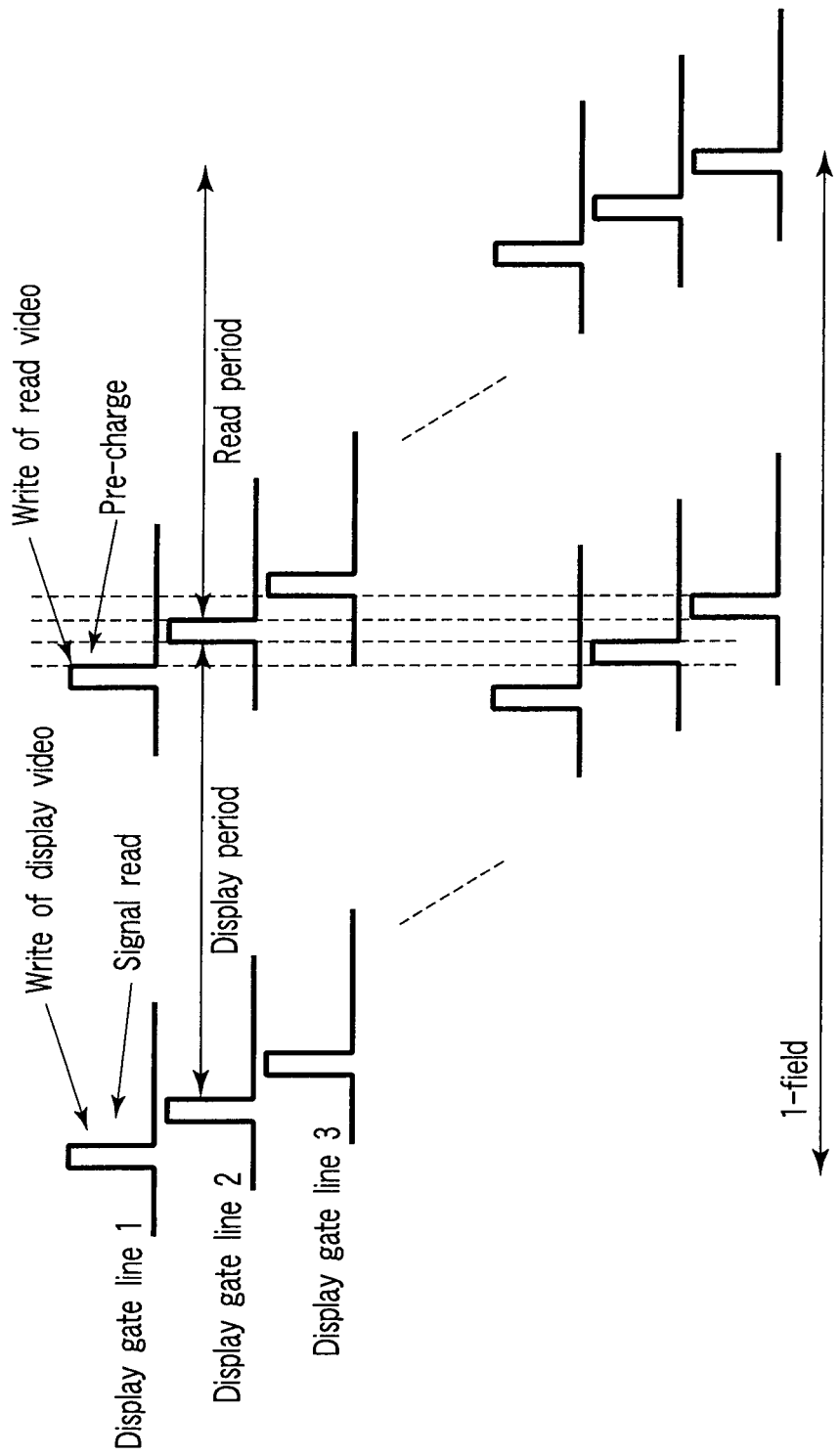
FIG. 17 is a time chart of a gate signal for achieving the read operation of the eighth embodiment.

FIG. 17 is a time chart of a gate signal for achieving the read operation described above.

A display video signal is written into the display unit in accordance with the active state of the display gate line 1, and the signal read gate line 1 turns to the active state substantially corresponding to the timing, so that a signal is read out to the signal read line from the read unit.

After a predetermined time elapses, a read video signal is written into the display unit in accordance with the active state of the display gate line 1, and the pre-charge gate line 1 turns to the active state substantially corresponding to the timing, so that the pre-charge of the read unit is executed.

The above operation is executed to a liquid crystal display element at each row.

In the eighth embodiment, the "display video" and "read video" are supplied to the display unit through the same signal line. Thus, these videos need to be changed over within a short time.

In the eighth embodiment, the pulse output timings of the display gate signal for writing the display video and the display gate signal for writing the read video are shifted by a pulse with respect to each other. That is, this embodiment has a feature in that the phases of the both pulses are shifted by a single pulse.

A "display video" is output from the signal line in accordance with a pulse signal of a display gate signal n. Then, a "read video" is output from the signal line in accordance with a pulse signal of a display gate line m of a timing one pulse after.

Corresponding to a pulse shift of the gate signal, the "display video" and "read video" from the signal line are changed over alternately and quickly. Consequently, as shown in FIG. 16, the belt of the read image can be scanned.

In this embodiment, a quick response liquid crystal, for example, OCB liquid crystal is used to display two videos within a single field.

In the eighth embodiment, to maintain bend alignment, the "read image" is preferred to be loaded with as high a voltage as possible by using the black insertion pulse at the same time.

Figure 18:
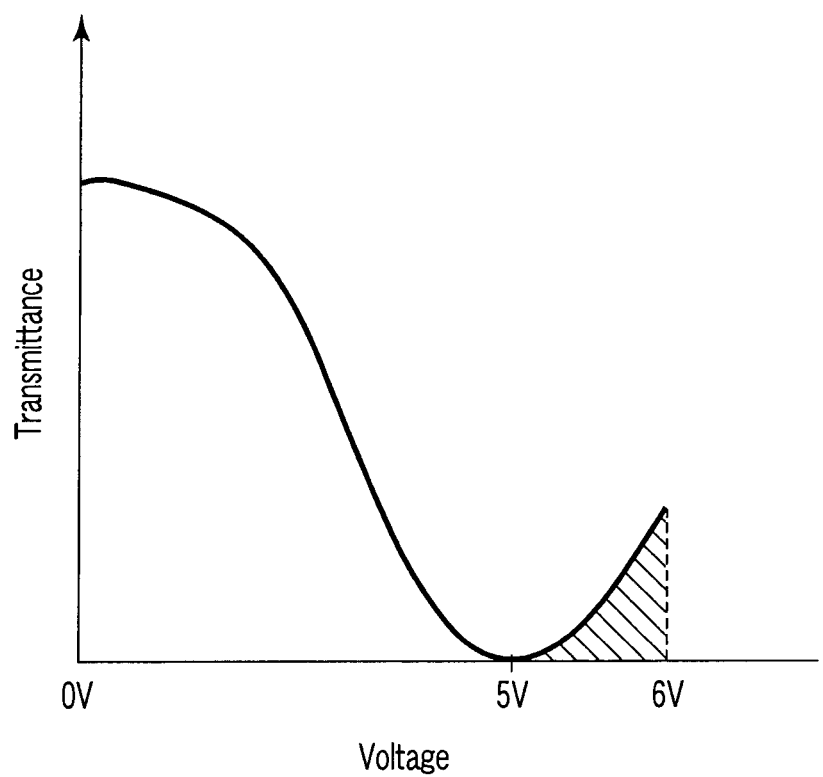
FIG. 18 is a graph showing a relationship between pixel voltage and transmittance of OCB liquid crystal.

FIG. 18 is a graph showing a relationship between the pixel voltage of the OCB liquid crystal and transmittance. The abscissa axis indicates a pixel voltage and the ordinate axis indicates transmittance. This graph shows an example of a normally white mode. In the OCB liquid crystal shown in FIG. 18, the screen turns to black temporarily when a voltage of 5V is applied, while the brightness increases if a higher voltage is applied.

As the read image, an image displayed uniformly at a gradation having a higher brightness than black is preferred. This is because, to read an original document with a transmission liquid crystal display apparatus, light from the backlight for illuminating the original document is necessary. However, if it is too bright, the contrast of a displayed image decreases, which is a problem. According to this consideration, to secure an illumination effect while maintaining the bend alignment effectively, it is preferable to apply a voltage higher than the black display voltage in order to secure a gray uniform image. For example, in FIG. 18, it is preferable to apply a voltage not higher than 6V which is a maximum voltage and higher than 5V which is the black display voltage.

Next, the signal read operation will be described. As described above, the pre-charge is executed substantially corresponding to a timing at which the read image is written. Then, a signal is read out at a timing at which the read image is terminated while it is changed over to the display image.

In the pixel structure shown in FIG. 2, the pre-charge line and the signal read line are formed independently, and the pre-charge gate line and the signal read gate line are formed independently. Accordingly, to achieve the above-mentioned read operation, it is not necessary to consider phase compensation by a single pulse as described in the display operation.

According to the eighth embodiment described above, the read image is inserted into a frame and scanned, and then, the pre-charge of the sensor and reading of the signal are achieved corresponding to the read image to be scanned. With such a configuration, read can be achieved while the display is executed.

In the eighth embodiment, three types of gate lines (display gate line, pre-charge gate line, and signal read gate line) are provided. Three types of the gate drivers need to be prepared in a liquid crystal driver using amorphous silicon, so that the quantity of pads mounted outside is increased, which is not an actual solution. Thus, in the eighth embodiment, a low-temperature polysilicon is used and a gate driver is incorporated in glass. A detection circuit or the like needs to be constructed on a source side for supplying video and it is formed of a low-temperature polysilicon circuit. To configure the eighth embodiment, the low-temperature polysilicon active matrix method is suitable.

Ninth Embodiment

In the ninth embodiment, like reference numbers are attached to the same components as the eighth embodiment, and detailed description thereof is omitted. An image reading method of the ninth embodiment uses a liquid crystal display element having the configuration shown in FIG. 10.

In the liquid crystal display element of FIG. 10, the pre-charge line and the signal read line are shared as a common line and further, the pre-charge gate line and the signal read gate line are shared as a common gate line.

To achieve this operation, a pre-charge gate pulse and a signal read gate pulse are output selectively from a common gate line, and corresponding to this, pre-charge supply and reading of a signal are changed over alternately in a common line for pre-charge and signal read, which is a vertical wiring. Thus, in the read operation of this embodiment, the same phase compensation as described in the display operation is implemented. That is, the phase is shifted by a single pulse.

Figure 19:
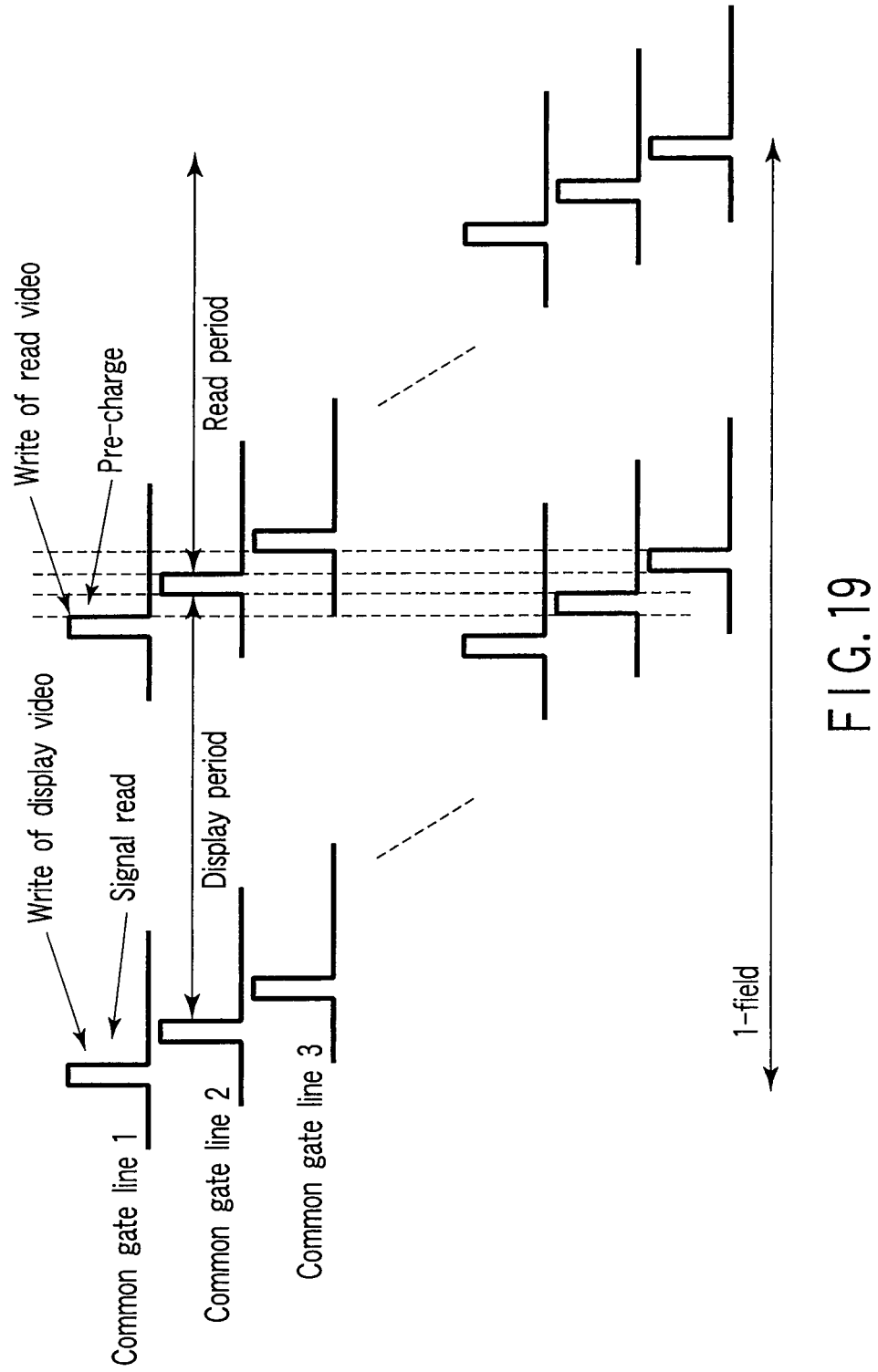
FIG. 19 is a time chart of a gate signal for achieving a read operation of a ninth embodiment.

FIG. 19 is a time chart of a gate signal for achieving the read operation described above.

A display video signal is written into the display unit in accordance with the active state of the display gate line 1 and then, the common gate line 1 turns to the active state substantially corresponding to the timing, so that a signal is read out to the common line from the read unit.

After a predetermined time elapses, a read video signal is written into the display unit corresponding to the active state of the display gate line 1, and the common gate line 1 turns to the active state substantially corresponding to the timing so as to execute pre-charge of the read unit.

With this operation, a signal is read out to the common line in accordance with a pulse signal of a common gate line n. Then, a pre-charge signal is supplied to the common line in accordance with a pulse signal of a common gate line m at a timing a next pulse after.

Tenth Embodiment

In the above-described respective embodiments, scanning of a displayed read video and scanning for reading a video are executed in agreement with a frame frequency. This can prevent a flicker or a feeling of disharmony from being felt in the displayed video.

However, the present invention is not restricted to this example. For example, by retarding the speed of read scanning with respect to the frame frequency (60 Hz), the screen may be scanned in a second to 10 seconds under a frequency of 1 Hz or 0.1 Hz. By providing with a pre-charge and signal read gate independently of the display gate, the belt-like read video can be scanned independently of the display frame.

FIG. 20 is a view for explaining an image reading method of the tenth embodiment of the present invention.

Although the display is completed with 60 Hz, the reading belt scanning is carried out with 0.1 Hz, so that it takes 10 seconds to scan a screen. Consequently, a higher read accuracy is achieved. Slow scanning is performed with a scanning width being every line. At this time, a belt-like white display is scanned synchronously with this scanning area in the displayed video. Principally, a read image (white belt here) may be displayed by the same amount as a lateral line of a read width. However, the larger the white displaying width, the higher read accuracy can be achieved. Actually, display of laterally 3 lines to 5 lines is ideal.

To scan this white line slowly, logical operation is performed on the displayed video so as to execute an operation of replacing part of a video signal with a white display.

As a result, a video in which a narrow lateral line moves slowly such that it overlaps a displayed video is observed. Such a display has an effect of allowing a user to recognize that a video is being fetched in currently, and is effective depending on applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
a display panel configured to have a plurality of scanning lines for which liquid crystal display elements each containing an optical input device and a display pixel are arranged, respectively;
a backlight configured to be arranged facing the display panel to illuminate the display panel; and
a control part configured to control writing into the display pixel and reading of a detection signal of the optical input device, wherein
the control part displays an external light detection image substantially shielding light from the backlight on the display pixels throughout a first period of a frame period, and displays a display image on the display pixels throughout a second period of the frame period, thereby an object is detected twice in the first period and the second period,
the control part reads a first detection signal of the optical input device when the first period is started, and reads a second detection signal of the optical input device when the second period is started, and
the control part includes an logical operation processing unit which performs a logical operation based on a result of reading the first detection signal and a result of reading the second detection signal.

2. The liquid crystal display apparatus according to claim 1, wherein the control part turns off the backlight from a start of the first period of the scanning line up to a termination of the first period of all the scanning lines.

3. The liquid crystal display apparatus according to claim 1, wherein the control part reads out a detection signal of the optical input device at any one of the start of the first period and the start of the second period.

4. The liquid crystal display apparatus according to claim 1, wherein the display pixel is formed by sandwiching an OCB liquid crystal between a pair of electrodes.

5. The liquid crystal display apparatus according to claim 4, wherein the external light detection image is formed by applying a voltage not less than a level at which energy of splay alignment and energy of bend alignment counter-balance between the electrodes.

6. A liquid crystal display apparatus comprising:
a display panel configured to have a plurality of scanning lines for which liquid crystal display elements each containing an optical input device and a display pixel are arranged, respectively;
a backlight configured to be arranged facing the display panel to illuminate the display panel;
a backlight blinking part configured to blink the backlight; and
a control part configured to control writing into the display pixel and reading of a detection signal of the optical input device,
wherein the backlight is configured to be capable of blinking and the control part alternately changes a bias voltage to be given to the optical input device synchronously with the blinking of the backlight, thereby an object is detected from the detection signal in a frame period, and
wherein the control part
displays an external light detection image substantially shielding light from the backlight on the display pixels and turns off the backlight throughout a first period of a frame period, and
displays a display image on the display pixel and turns on the backlight throughout a second period of the frame period.

7. The liquid crystal display apparatus according to claim 6, wherein the control part reads out a detection signal from the optical input device when the second period is terminated.

8. The liquid crystal display apparatus according to claim 6, wherein
the display pixel is formed by sandwiching an OCB liquid crystal between a pair of electrodes, and
a black video to be inserted for maintaining a bend alignment for a reverse transition prevention period is used as the external light detection image in the first period.

9. A liquid crystal display apparatus comprising:
a display panel configured to have a plurality of scanning lines for which liquid crystal display elements each containing an input device and a display pixel are arranged, respectively;
a backlight configured to be arranged facing the display panel to illuminate the display panel; and
a control part configured to control writing into the display pixel and reading of a detection signal of the input device, wherein the control part displays an external light detection image substantially shielding light from the backlight on the display pixels throughout a first period of a frame period, and displays a display image on the display pixels throughout a second period of the frame period, thereby an object is detected twice in the first period and the second period.

* * * * *

UNITED STATES PATENT AND TRADEMARK OFFICE
CERTIFICATE OF CORRECTION

PATENT NO. : 8,674,949 B2
APPLICATION NO. : 12/032236
DATED : March 18, 2014
INVENTOR(S) : Kenji Nakao et al.

It is certified that error appears in the above-identified patent and that said Letters Patent is hereby corrected as shown below:

On the title page, Item (73) should read:

--(73) Assignee: Japan Display Inc., Tokyo (JP)--

Signed and Sealed this
Twentieth Day of May, 2014

Michelle K. Lee
*Deputy Director of the United States Patent and Trademark Office*